(12) United States Patent
Singh

(10) Patent No.: US 11,768,955 B2
(45) Date of Patent: Sep. 26, 2023

(54) MITIGATING INSECURE DIGITAL STORAGE OF SENSITIVE INFORMATION

(71) Applicant: Citrix Systems, Inc., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 148 days.

(21) Appl. No.: 17/121,847

(22) Filed: Dec. 15, 2020

(65) Prior Publication Data

US 2022/0188450 A1    Jun. 16, 2022

(51) Int. Cl.
G06F 21/62    (2013.01)
G06F 21/31    (2013.01)
G06F 21/46    (2013.01)
H04L 9/40    (2022.01)

(52) U.S. Cl.
CPC .......... *G06F 21/6245* (2013.01); *G06F 21/31* (2013.01); *G06F 21/46* (2013.01); *H04L 63/1416* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 10,956,239 B1* | 3/2021 | Kochura | G06F 16/93 |
| 11,057,464 B1* | 7/2021 | Wei | G06F 3/0656 |
| 11,099,865 B2* | 8/2021 | Ma | G06F 9/451 |
| 2007/0011749 A1* | 1/2007 | Allison | G06F 21/6218 713/165 |
| 2008/0028442 A1* | 1/2008 | Kaza | H04L 63/145 726/4 |
| 2012/0226913 A1* | 9/2012 | Park | G06F 21/10 713/189 |
| 2014/0278733 A1* | 9/2014 | Sabharwal | G06Q 10/0635 705/7.28 |
| 2015/0310220 A1* | 10/2015 | Brooks | G06F 21/606 713/189 |
| 2016/0306964 A1* | 10/2016 | Austin | G06F 21/556 |

(Continued)

FOREIGN PATENT DOCUMENTS

EP    3196798 A1    7/2017

OTHER PUBLICATIONS

Mar. 14, 2022—(WO) International Search Report and Written Opinion—App PCT/US2021/072633.

*Primary Examiner* — James R Turchen

(57) ABSTRACT

Examples described herein attempt to mitigate risk associated with digitally storing sensitive information (e.g., passwords) in insecure applications and transferring the stored sensitive information to a sensitive information field (e.g., a password field in a login page). A computing device may detect a transfer to a sensitive field. The computing device may determine if a source application for the transfer is an insecure application. If the source application is an insecure application, the computing device may provide a risk mitigation action. The computing device may also transmit to an analytic server telemetry data comprising the identification of the source application, identification of a target application containing the sensitive information field, and a username associated with the computing device. The analytic server may calculate risk score based on the received telemetry data and provide further risk mitigation actions to the computing device.

18 Claims, 10 Drawing Sheets

(56) References Cited

U.S. PATENT DOCUMENTS

| | | | |
|---|---|---|---|
| 2017/0004316 A1* | 1/2017 | Walton | G06F 21/6245 |
| 2017/0154188 A1* | 6/2017 | Meier | G06F 21/552 |
| 2018/0248698 A1* | 8/2018 | Komin | G06F 21/45 |
| 2019/0370457 A1* | 12/2019 | Shultz | G06F 21/45 |
| 2020/0202268 A1 | 6/2020 | Retna | G06N 20/00 |
| 2020/0280574 A1* | 9/2020 | Adams | G06F 16/955 |

* cited by examiner

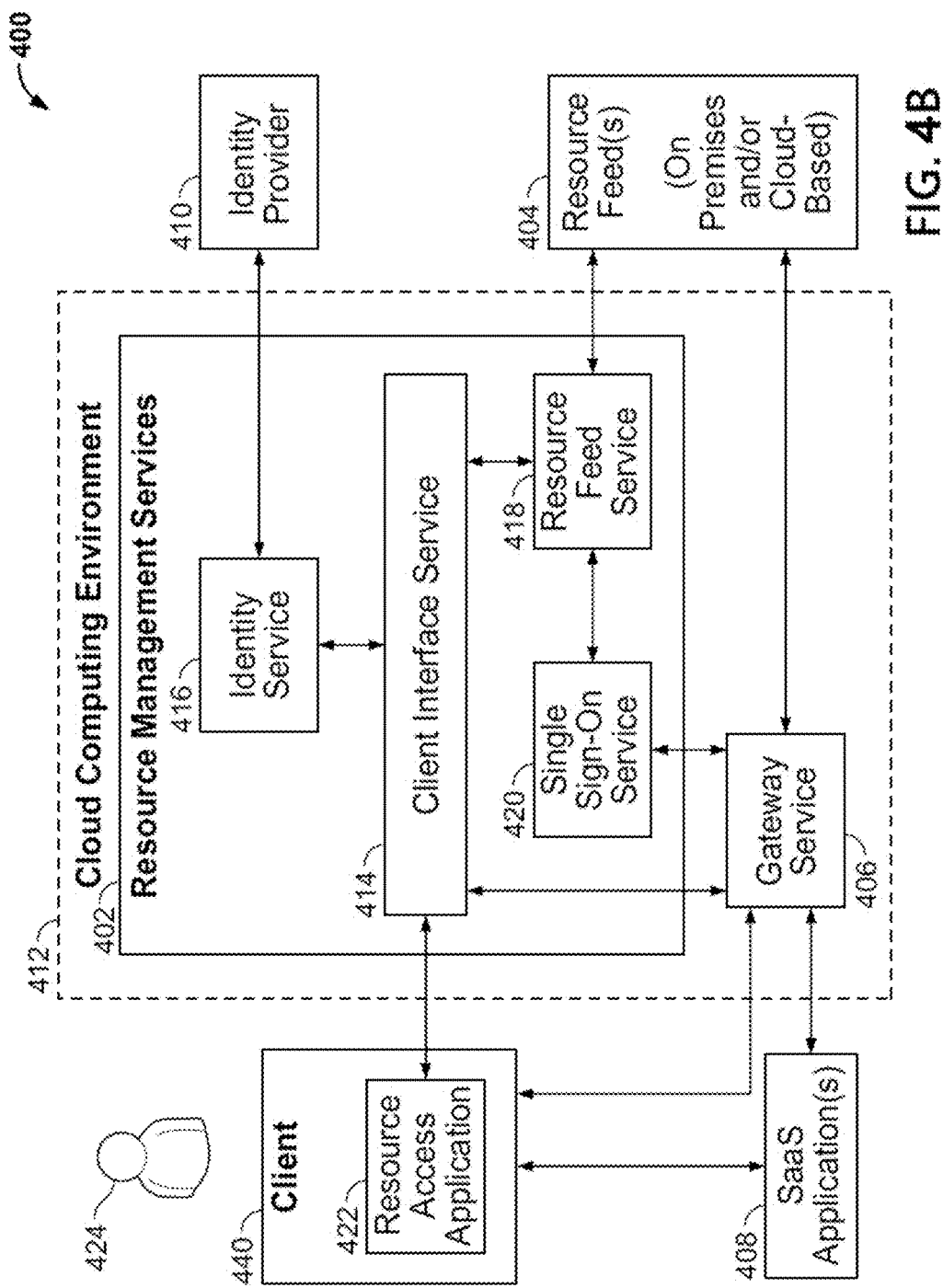

MITIGATING INSECURE DIGITAL STORAGE OF SENSITIVE INFORMATION

FIELD

Aspects described herein generally relate to enterprise computer systems, and more particularly identification and mitigation of insecure storage of sensitive information within enterprise computer systems.

BACKGROUND

Enterprise computer systems may be maintained by large entities such as corporations to perform various operations such as data storage, data processing, automation, communication, etc. Many of these operations are sensitive and/or confidential, and some of these computer systems and the operations performed by these systems may have various security requirements, e.g., users trying to access these secure systems or control these secure operations may have to be authenticated using passwords and/or any other type of access control/sensitive information, which should not be shared with other users.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Users storing credentials (e.g., passwords) and/or sensitive information in insecure applications (e.g., notepad), and transferring of (e.g., by copying and pasting) stored credentials in sensitive information fields (e.g., a password field in a login page) is a security risk for enterprise computer systems. Nefarious actors may be able to access these insecure applications and/or clipboards where the information is copied to steal the stored credentials and use the stolen credentials for attacking the enterprise computer systems.

To overcome limitations described above, and to overcome other limitations that will be apparent upon reading and understanding the present specification, aspects described herein are directed towards detecting whether login credentials (or any other sensitive information) are transferred from an insecure application to a secure login credential field. A computing device may set event listeners to detect the transfer, such as copy listeners to detect copy events and paste listeners to detect paste events. When the computing device detects a copy event using a copy listener, the computing device may collect information of the source application (e.g., a local application or a browser-based web application) from which information was copied from. When the computing device detects a paste event using a paste listener, the computer may determine whether the pasting is to a sensitive information field (e.g., a password filed within a login page). Pasting of information to a sensitive information field may pose a risk to the enterprise computer system, and the computing device may collect information about the target application in addition to the source application. The computing device may also perform one or more risk mitigation actions based on the collected information. The computing device may also send information about the source application, the target application, and the user associated with the computing device to an analytic server. The analytic server may perform risk assessment and generate a risk score base. The analytic server may also generate a dashboard showing a unified view of risk scores for various users and devise. Based on the risk score and the received data, the analytic server may generate and transmit one or more mitigation actions (e.g., mitigation instructions) to the client computing device. The mitigation instructions may include, for example, instructions to warn the user, instructions to prompt the user to change login credentials (e.g., perform a password reset), or locking the user account. Therefore, the examples described herein may aid mitigation of risky copy-paste behavior within enterprise computer systems.

In an example, a method may comprise detecting, by a computing device, a transfer of data from one application to another, the transfer including a field to receive sensitive information; determining, by the computing device, that the one application of the transfer is insecure; and in response to the computing device determining that the one application is insecure: providing, by the computing device, an action so as to mitigate use of sensitive information within the one application.

In another example, an apparatus may comprise at least one processor; memory storing instructions that, when executed by the at least one processor, cause the apparatus to: detect a transfer of data from one application to another, the transfer including a field to receive sensitive information; determine that the one application of the transfer is insecure; in response to the processor determining that the one application is insecure: provide an action so as to mitigate use of sensitive information within the one application.

In yet another example, a method may comprise receiving, by an analytic server from a client computing device, data associated with a transfer of sensitive information at the client computing device, the data comprising identification of: a user associated with the client computing device, a source application for the transfer, a target application for the transfer, information type of the sensitive information, and client computing device type; generating, by the analytic server, a risk score associated with the transfer based on the received data; generating, by the analytic server, one or more actions based on the generated risk score and the received data; and transmitting, by the analytic server to the client computing device, the one or more actions.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 4A-4C depict another illustrative cloud-based architecture that may be used in accordance with one or more illustrative aspects described herein.

DETAILED DESCRIPTION

Figure 1:
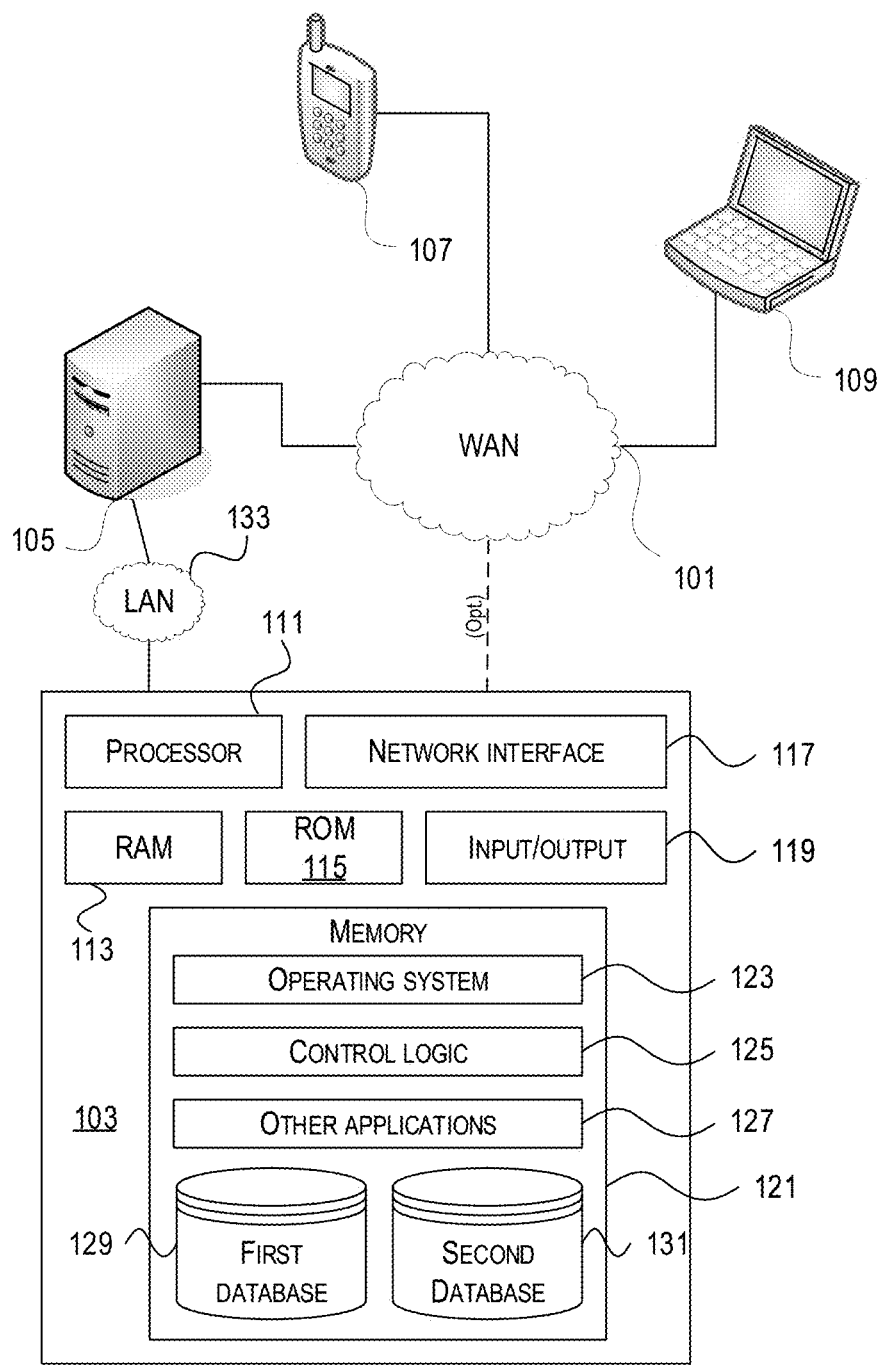
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

Many users digitally store login credentials (e.g., passwords) and/or other sensitive information for convenience. A user may transfer a stored credential to a sensitive information field (e.g., a password field) for conveniently logging into the secure portions of an enterprise computer system. This behavior poses a security risk for the enterprise computer system. It is generally not risky when the user stores the login credentials in a secure application such as a password manager. A password manager may be secure because it may require user authentication for access and/or may have other security protocols to secure its contents. However, if the user stores the login credentials in an insecure application such as a notepad, team accessible text (e.g., Slack channel) and copies and paste those credentials to sensitive information fields, this may provide an area of vulnerability for bad actors such as hackers or insider threats. An insecure application may not have security or authentication protocols, for example, an insecure application may be accessed by anyone who has access to a computer that has the insecure application (e.g., a notepad installed on the computer). Bad actors may access the a local notepad or the team accessible text through means such as social engineering and steal the stored credentials. They may then use the stolen credentials to launch an attack on the enterprise computer system.

The examples described herein attempt to mitigate or otherwise detect this risk of insecure digital storage of login credentials (e.g., passwords). It should be understood that the login credentials are provided merely as examples for the brevity of explanation and should not be considered limiting. Aspects described herein can be applied to other type of sensitive information, such as credit card numbers and expiry dates, social security numbers, dates of birth, driver license numbers, bank account numbers, and/or any other type of sensitive information.

A computing device, within the enterprise computing system, may set event listeners. An event listener may be a program running locally or remotely that may detect a corresponding event, e.g., detect that some information has been copied. The event listeners may include, for example, copy listeners, paste listeners, clipboard listeners, navigation listeners, drag and drop listeners, and/or any other types of listeners. The computing device may use a copy listener to detect a copy event. Upon detecting the copy event, the computing device may identify a source application (e.g., application running locally or a browser-based web application) that information was copied from. Examples of the identification process are detailed below in the description of step 610 of FIG. 6. The computing device may further use a paste listener to detect a subsequent paste event. Upon detecting the paste event, the computing may determine whether the paste event was to a sensitive information field (e.g., a password field). Examples of this determination are detailed in the description of step 616 of FIG. 6. If the computing device makes such determination, the computing device may check whether the source application is a secure application such as a password manager. For instance, the computing device may be configured with a list of trusted, secure application. The computing device may compare the identified source application with this list to determine whether the source application is a secure application. The source application being a password manager may have minimal security risks. However, if the source application is not a password manager but an insecure application (e.g., a notepad), the insecure application is vulnerable to attack. The computing device may perform risk mitigation operations. The risk mitigation operations may include, for example, signing out the user, locking the user's account, and/or any other type of risk mitigation operation. The computing device may also collect the data regarding the insecure source application, the target application, user associated with the computing device, time of the copy-paste events, and/or other pieces of data and send this data (also referred to as telemetry data) to a back-end analytic server. The back-end analytic server may process the telemetry data to further identify risks, determine the severity of the identified risks, and generate further risk mitigation instructions for the computing device. In some instances, the computing device may also set paste listeners for a list of applications or domain URLs (examples of web-applications) configured by an admin user. These applications and/or domain URLs may be associated with a non-enterprise, low-security account of the user, and any paste event to these applications and/or domain URLs may be filtered out by the computing device.

The analytic server may use the received data to generate a score (e.g., risk score). The score may indicate the severity of risk posed by the user's password copy-paste behavior. The score may be based on weighing different risk factors (e.g., whether the user has higher privileges in the enterprise computer system). The analytic server may also generate a dashboard for an admin user to have a unified view of risk behaviors of the users of the enterprise computer system. The analytic server may also transmit mitigation instructions to the client computing device based on the risk and the received data. The mitigation instructions may also be based on configurable policies, e.g., an user account with higher privileges may be locked for a first instance of a risky copy-paste behavior but a general user account may not be locked and the user may be just provided a warning. The analytic server may also use other information (e.g., historical information) to generate the risk score and/or the mitigation instructions. The analytic server may also update its methods (e.g., to compute the score) as the amount of historical and/or any other type of information grows.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and their equivalents. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes only and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client computer 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

The components 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage)

media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
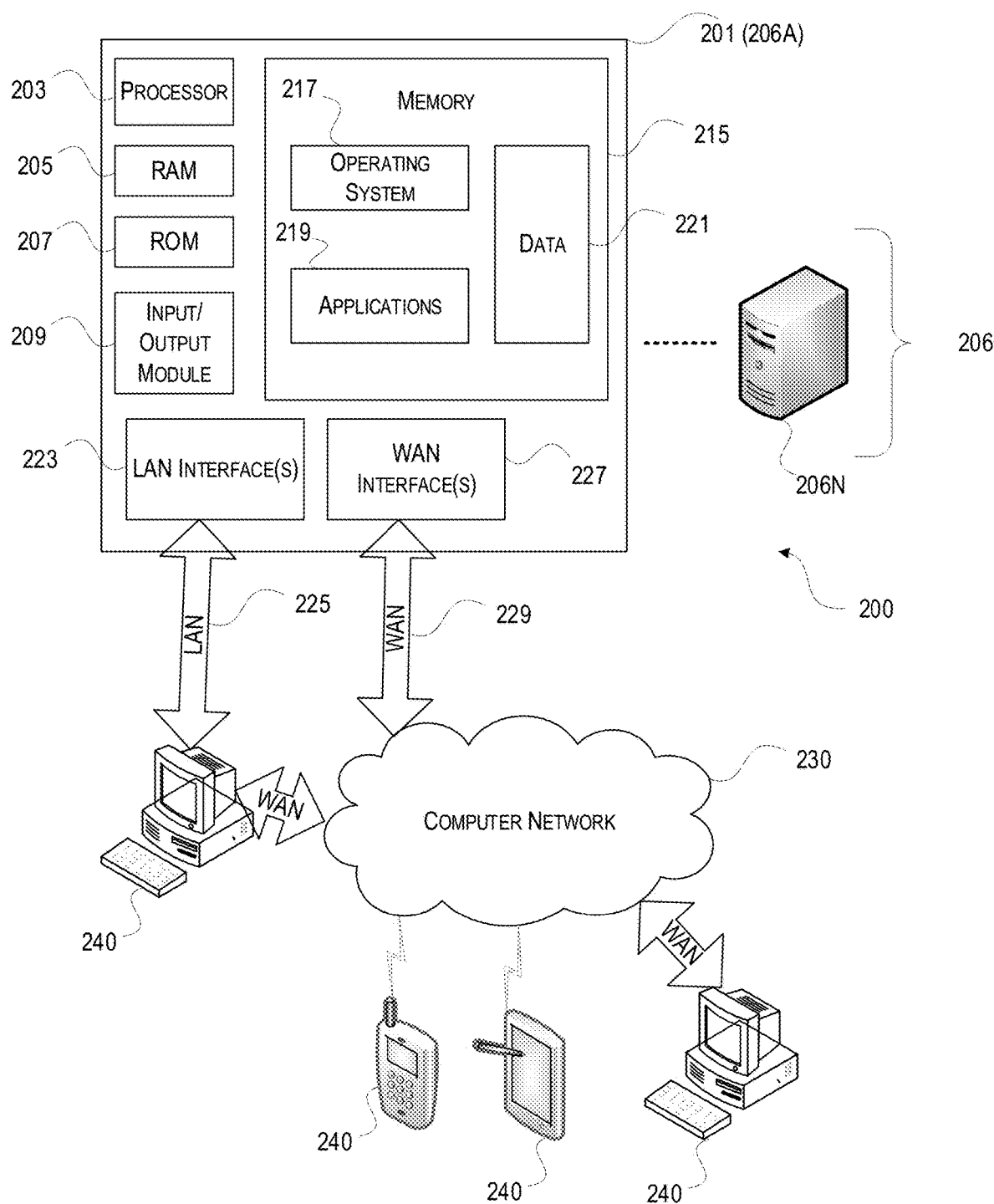
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client device 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
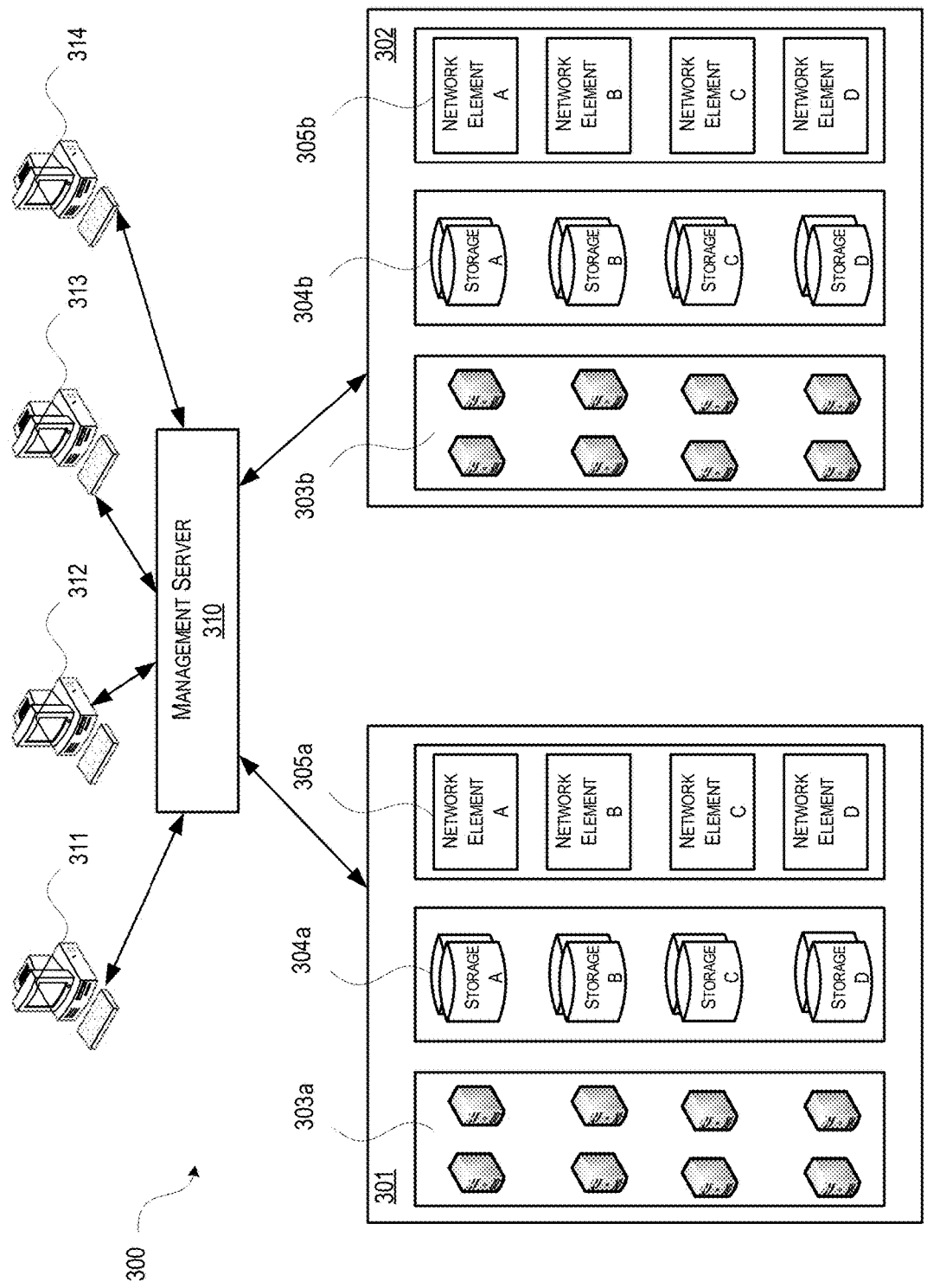
FIG. 3 depicts an illustrative cloud-based system architecture that may be used in accordance with one or more illustrative aspects described herein.

With further reference to FIG. 3, some aspects described herein may be implemented in a cloud-based environment. FIG. 3 illustrates an example of a cloud computing environment (or cloud system) 300. As seen in FIG. 3, client computers 311-314 may communicate with a cloud management server 310 to access the computing resources (e.g., host servers 303a-303b (generally referred herein as "host servers 303"), storage resources 304a-304b (generally referred herein as "storage resources 304"), and network elements 305a-305b (generally referred herein as "network resources 305")) of the cloud system.

Management server 310 may be implemented on one or more physical servers. The management server 310 may run, for example, Citrix Cloud by Citrix Systems, Inc. of Ft. Lauderdale, Fla., or OPENSTACK, among others. Management server 310 may manage various computing resources, including cloud hardware and software resources, for example, host computers 303, data storage devices 304, and networking devices 305. The cloud hardware and software resources may include private and/or public components. For example, a cloud may be configured as a private cloud to be used by one or more particular customers or client computers 311-314 and/or over a private network. In other embodiments, public clouds or hybrid public-private clouds may be used by other customers over an open or hybrid networks.

Management server 310 may be configured to provide user interfaces through which cloud operators and cloud customers may interact with the cloud system 300. For example, the management server 310 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 310 also may include a set of APIs and/or one or more customer console applications with user interfaces configured to receive cloud computing requests from end users via client computers 311-314, for example, requests to create, modify, or destroy virtual machines within the cloud. Client computers 311-314 may connect to management server 310 via the Internet or some other communication network, and may request access to one or more of the computing resources managed by management server 310. In response to client requests, the management server 310 may include a resource manager configured to select and provision physical resources in the hardware layer of the cloud system based on the client requests. For example, the management server 310 and additional components of the cloud system may be configured to provision, create, and manage virtual machines and their operating environments (e.g., hypervisors, storage resources, services offered by the network elements, etc.) for customers at client computers 311-314, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 311-314 may be related, for example, to different client computers creating virtual machines on behalf of the same end user, or different users affiliated with the same company or organization. In other examples, certain clients 311-314 may be unrelated, such as users affiliated with different companies or organizations. For unrelated clients, information on the virtual machines or storage of any one user may be hidden from other users.

Referring now to the physical hardware layer of a cloud computing environment, availability zones 301-302 (or zones) may refer to a collocated set of physical computing resources. Zones may be geographically separated from other zones in the overall cloud of computing resources. For example, zone 301 may be a first cloud datacenter located in California, and zone 302 may be a second cloud datacenter located in Florida. Management server 310 may be located at one of the availability zones, or at a separate location. A zone may include an internal network that interfaces with devices that are outside of the zone, such as the management server 310, through a gateway. End users of the cloud (e.g., clients 311-314) might or might not be aware of the distinctions between zones. For example, an end user may request the creation of a virtual machine having a specified amount of memory, processing power, and network capabilities. The management server 310 may respond to the user's request and may allocate the resources to create the virtual machine without the user knowing whether the virtual machine was created using resources from zone 301 or zone 302. In other examples, the cloud system may allow end users to request that virtual machines (or other cloud resources) are allocated in a specific zone or on specific resources 303-305 within a zone.

In this example, the zones 301-302 may include an arrangement of various physical hardware components (or computing resources) 303-305, for example, physical hosting resources (or processing resources), physical network resources, physical storage resources, switches, and additional hardware resources that may be used to provide cloud computing services to customers. The physical network resources in a cloud zone 301 or 302 may include one or more network elements 305 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 301-302 may include storage disks (e.g., solid state drives (SSDs), magnetic hard disks, etc.) and other storage devices.

The example cloud computing environment shown in FIG. 3 also may include a virtualization layer with additional hardware and/or software resources configured to create and manage virtual machines and provide other services to customers using the physical resources in the cloud. The virtualization layer may include hypervisors along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in the virtualization servers 303 with the physical computing resources. Known cloud systems may alternatively be used, e.g., MICROSOFT AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Figure 4A:
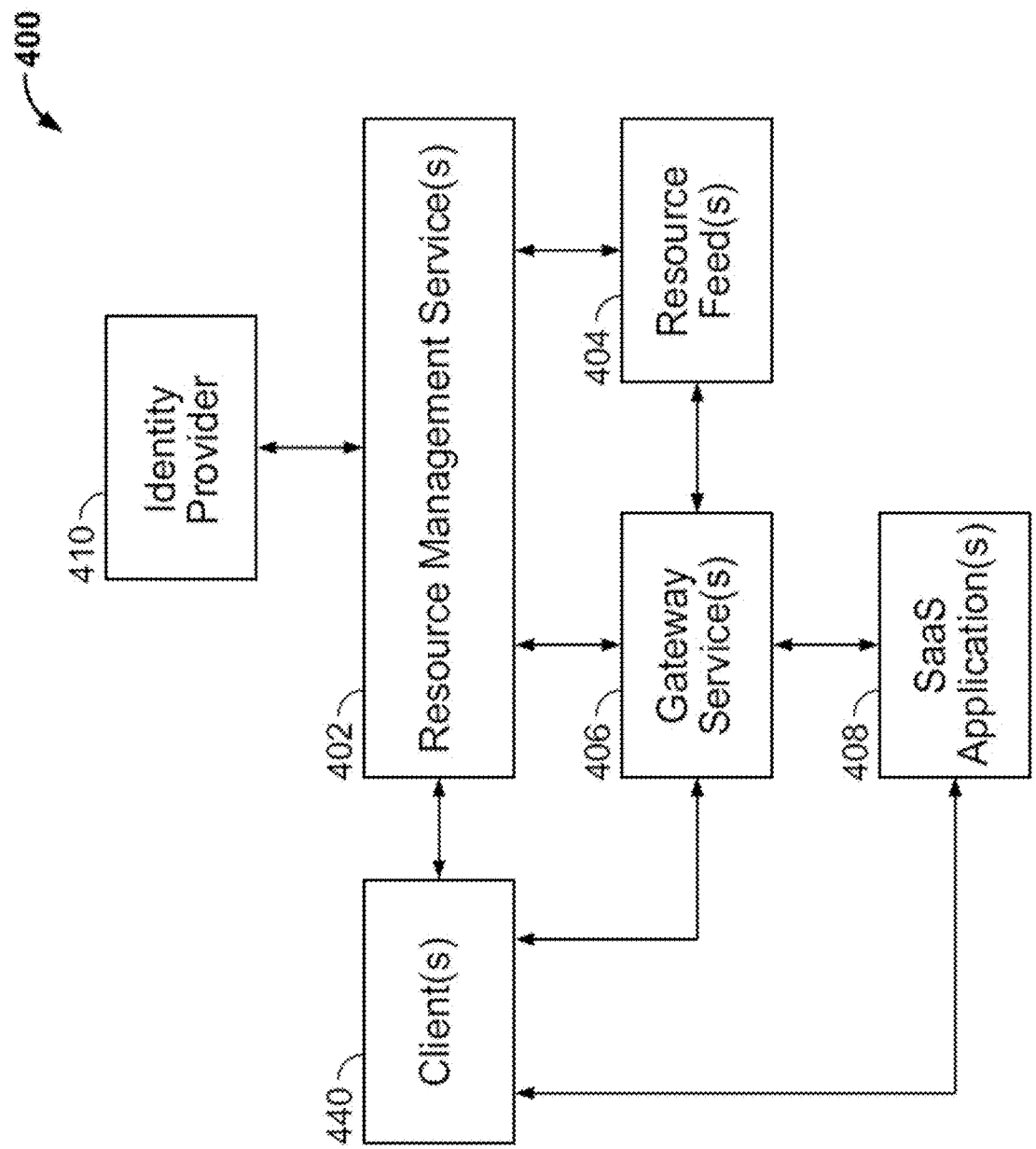

FIG. 4A is a block diagram of an example multi-resource access system 400 in which one or more resource management services 402 may manage and streamline access by one or more clients 440 to one or more resource feeds 404 (via one or more gateway services 406) and/or one or more software-as-a-service (SaaS) applications 408. In particular, the resource management service(s) 402 may employ an identity provider 410 to authenticate the identity of a user of a client 440 and, following authentication, identify one of more resources the user is authorized to access. In response to the user selecting one of the identified resources, the resource management service(s) 402 may send appropriate access credentials to the requesting client 440, and the client 440 may then use those credentials to access the selected resource. For the resource feed(s) 404, the client 440 may use the supplied credentials to access the selected resource via a gateway service 406. For the SaaS application(s) 408, the client 440 may use the credentials to access the selected application directly.

The client(s) 440 may be any type of computing devices capable of accessing the resource feed(s) 404 and/or the SaaS application(s) 408, and may, for example, include a variety of desktop or laptop computers, smartphones, tablets, etc. The resource feed(s) 404 may include any of numerous resource types and may be provided from any of numerous locations. In some embodiments, for example, the resource feed(s) 404 may include one or more systems or services for providing virtual applications and/or desktops to the client(s) 440, one or more file repositories and/or file sharing systems, one or more secure browser services, one or more access control services for the SaaS applications 408, one or more management services for local applications on the client(s) 440, one or more internet enabled devices or sensors, etc. The resource management service(s) 402, the resource feed(s) 404, the gateway service(s) 406, the SaaS application(s) 408, and the identity provider 410 may be located within an on-premises data center of an organization for which the multi-resource access system 400 is deployed, within one or more cloud computing environments, or elsewhere.

FIG. 4B is a block diagram showing an example implementation of the multi-resource access system 400 shown in FIG. 4A in which various resource management services 402 as well as a gateway service 406 are located within a cloud computing environment 412. The cloud computing environment may, for example, include Microsoft Azure Cloud, Amazon Web Services, Google Cloud, or IBM Cloud. It should be appreciated, however, that in other implementations, one or more (or all) of the components of the resource management services 402 and/or the gateway service 406 may alternatively be located outside the cloud computing environment 412, such as within a data center hosted by an organization.

For any of the illustrated components (other than the client 440) that are not based within the cloud computing environment 412, cloud connectors (not shown in FIG. 4B) may be used to interface those components with the cloud computing environment 412. Such cloud connectors may, for example, run on Windows Server instances and/or Linux Server instances hosted in resource locations and may create a reverse proxy to route traffic between those resource locations and the cloud computing environment 412. In the illustrated example, the cloud-based resource management services 402 include a client interface service 414, an identity service 416, a resource feed service 418, and a single sign-on service 420. As shown, in some embodiments, the client 440 may use a resource access application 422 to communicate with the client interface service 414 as well as to present a user interface on the client 440 that a user 424 can operate to access the resource feed(s) 404 and/or the SaaS application(s) 408. The resource access application 422 may either be installed on the client 440, or may be executed by the client interface service 414 (or elsewhere in the multi-resource access system 400) and accessed using a web browser (not shown in FIG. 4B) on the client 440.

As explained in more detail below, in some embodiments, the resource access application 422 and associated components may provide the user 424 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 422 is launched or otherwise accessed by the user 424, the client interface service 414 may send a sign-on request to the identity service 416. In some embodiments, the identity provider 410 may be located on the premises of the organization for which the multi-resource access system 400 is deployed. The identity provider 410 may, for example, correspond to an on-premises Windows Active Directory. In such embodiments, the identity provider 410 may be connected to the cloud-based identity service 416 using a cloud connector (not shown in FIG. 4B), as described above. Upon receiving a sign-on request, the identity service 416 may cause the resource access application 422 (via the client interface service 414) to prompt the user 424 for the user's authentication credentials (e.g., user-name and password). Upon receiving the user's authentication credentials, the client interface service 414 may pass the credentials along to the identity service 416, and the identity service 416 may, in turn, forward them to the identity provider 410 for authentication, for example, by comparing them against an Active Directory domain. Once the identity service 416 receives confirmation from the identity provider 410 that the user's identity has been properly authenticated, the client interface service 414 may send a request to the resource feed service 418 for a list of subscribed resources for the user 424.

In other embodiments (not illustrated in FIG. 4B), the identity provider 410 may be a cloud-based identity service, such as a Microsoft Azure Active Directory. In such embodiments, upon receiving a sign-on request from the client interface service 414, the identity service 416 may, via the client interface service 414, cause the client 440 to be redirected to the cloud-based identity service to complete an authentication process. The cloud-based identity service may then cause the client 440 to prompt the user 424 to enter the user's authentication credentials. Upon determining the user's identity has been properly authenticated, the cloud-based identity service may send a message to the resource access application 422 indicating the authentication attempt was successful, and the resource access application 422 may then inform the client interface service 414 of the successfully authentication. Once the identity service 416 receives confirmation from the client interface service 414 that the user's identity has been properly authenticated, the client interface service 414 may send a request to the resource feed service 418 for a list of subscribed resources for the user 424.

The resource feed service 418 may request identity tokens for configured resources from the single sign-on service 420. The resource feed service 418 may then pass the feed-specific identity tokens it receives to the points of authentication for the respective resource feeds 404. The resource feeds 404 may then respond with lists of resources configured for the respective identities. The resource feed service 418 may then aggregate all items from the different feeds and forward them to the client interface service 414, which may cause the resource access application 422 to present a list of available resources on a user interface of the client 440. The list of available resources may, for example, be presented on the user interface of the client 440 as a set of selectable icons or other elements corresponding to accessible resources. The resources so identified may, for example, include one or more virtual applications and/or desktops (e.g., Citrix Virtual Apps and Desktops™ VMware Horizon, Microsoft RDS, etc.), one or more file repositories and/or file sharing systems (e.g., Sharefile®, one or more secure browsers, one or more internet enabled devices or sensors, one or more local applications installed on the client 440, and/or one or more SaaS applications 408 to which the user 424 has subscribed. The lists of local applications and the SaaS applications 408 may, for example, be supplied by resource feeds 404 for respective services that manage which such applications are to be made available to the user 424 via the resource access application 422. Examples of SaaS applications 408 that may be managed and accessed as described herein include Microsoft Office 365 applications, SAP SaaS applications, Workday applications, etc.

For resources other than local applications and the SaaS application(s) 408, upon the user 424 selecting one of the listed available resources, the resource access application 422 may cause the client interface service 414 to forward a request for the specified resource to the resource feed service 418. In response to receiving such a request, the resource feed service 418 may request an identity token for the corresponding feed from the single sign-on service 420. The resource feed service 418 may then pass the identity token received from the single sign-on service 420 to the client interface service 414 where a launch ticket for the resource may be generated and sent to the resource access application 422. Upon receiving the launch ticket, the resource access application 422 may initiate a secure session to the gateway service 406 and present the launch ticket. When the gateway service 406 is presented with the launch ticket, it may initiate a secure session to the appropriate resource feed and present the identity token to that feed to seamlessly authenticate the user 424. Once the session initializes, the client 440 may proceed to access the selected resource.

When the user 424 selects a local application, the resource access application 422 may cause the selected local application to launch on the client 440. When the user 424 selects a SaaS application 408, the resource access application 422 may cause the client interface service 414 to request a one-time uniform resource locator (URL) from the gateway service 406 as well a preferred browser for use in accessing the SaaS application 408. After the gateway service 406 returns the one-time URL and identifies the preferred browser, the client interface service 414 may pass that information along to the resource access application 422. The client 440 may then launch the identified browser and initiate a connection to the gateway service 406. The gateway service 406 may then request an assertion from the single sign-on service 420. Upon receiving the assertion, the gateway service 406 may cause the identified browser on the client 440 to be redirected to the logon page for identified SaaS application 408 and present the assertion. The SaaS may then contact the gateway service 406 to validate the assertion and authenticate the user 424. Once the user has been authenticated, communication may occur directly between the identified browser and the selected SaaS application 408, thus allowing the user 424 to use the client 440 to access the selected SaaS application 408.

In some embodiments, the preferred browser identified by the gateway service 406 may be a specialized browser embedded in the resource access application 422 (when the resource access application 422 is installed on the client 440) or provided by one of the resource feeds 404 (when the resource access application 422 is located remotely), e.g., via a secure browser service. In such embodiments, the SaaS applications 408 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 440 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 404) for assessment of its security risk by a web filtering service. For approved URLs, the specialized browser may be permitted to access the link. For suspicious links, however, the web filtering service may have the client interface service 414 send the link to a secure browser service, which may start a new virtual browser session with the client 440, and thus allow the user to access the potentially harmful linked content in a safe environment.

In some embodiments, in addition to or in lieu of providing the user 424 with a list of resources that are available to be accessed individually, as described above, the user 424 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 440 to notify a user 424 of something that requires the user's attention (e.g., approval of an expense report, new course available for registration, etc.).

Figure 4C:
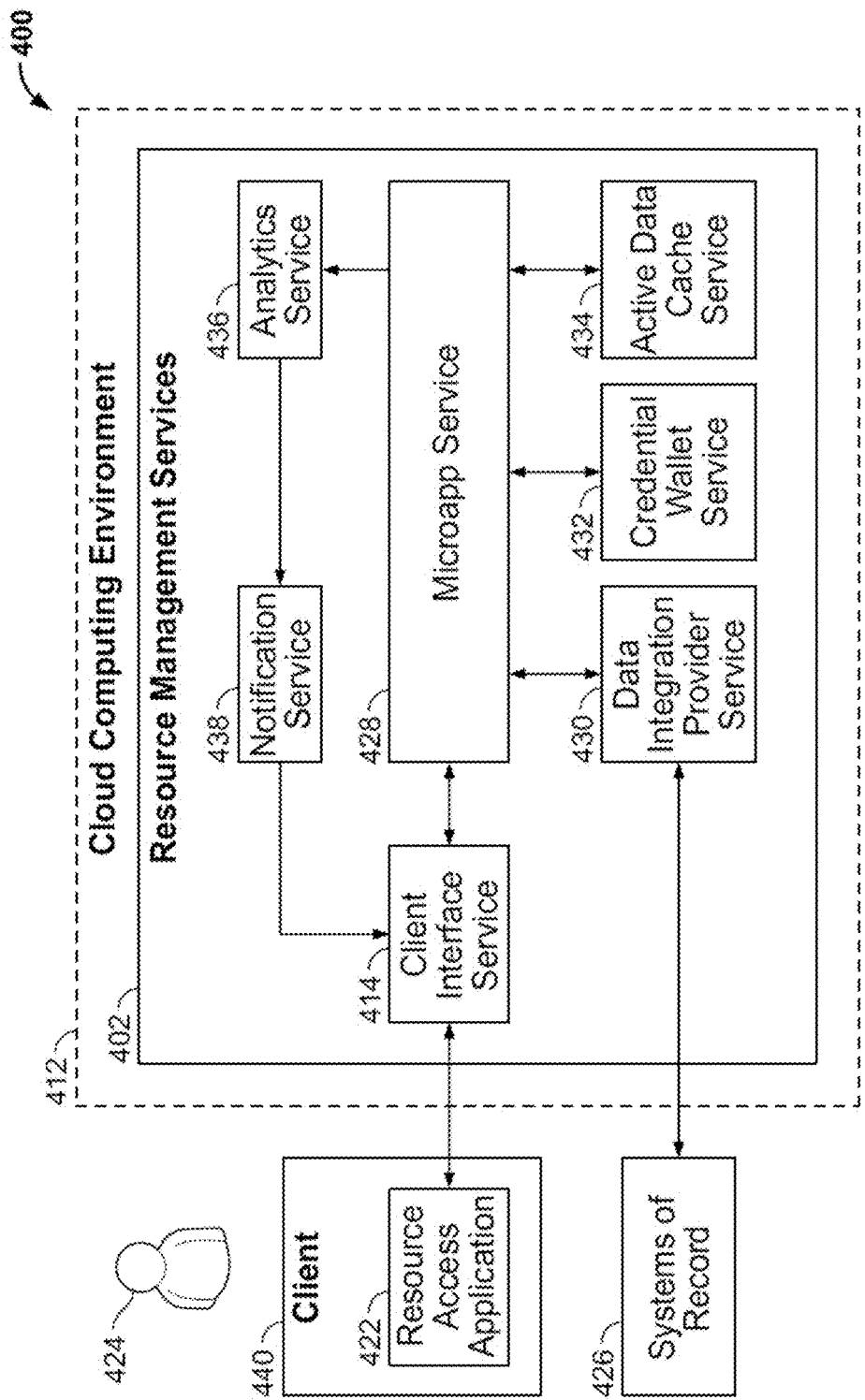

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 426 labeled "systems of record," and further in which several different services are included within the resource management services block 402. As explained below, the services shown in FIG. 4C may enable the provision of a streamlined resource activity feed and/or notification process for a client 440. In the example shown, in addition to the client interface service 414 discussed above, the illustrated services include a microapp service 428, a data integration provider service 430, a credential wallet service 432, an active data cache service 434, an analytics service 436, and a notification service 438. In various embodiments, the services shown in FIG. 4C may be employed either in addition to or instead of the different services shown in FIG. 4B. Further, as noted above in connection with FIG. 4B, it should be appreciated that, in other implementations, one or more (or all) of the components of the resource management services 402 shown in FIG. 4C may alternatively be located outside the cloud computing environment 412, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 422 without having to launch the native application. The system shown in FIG. 4C may, for example, aggregate relevant notifications, tasks, and insights, and thereby give the user 424 a dynamic productivity tool. In some embodiments, the resource activity feed may be intelligently populated by utilizing machine learning and artificial intelligence (AI) algorithms Further, in some implementations, microapps may be configured within the cloud computing environment 412, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 426 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 430, may, for example, support REST API, JSON, OData-JSON, and 6ML. As explained in more detail below, the data integration provider service 430 may also write back to the systems of record, for example, using OAuth2 or a service account.

In some embodiments, the microapp service 428 may be a single-tenant service responsible for creating the microapps. The microapp service 428 may send raw events, pulled from the systems of record 426, to the analytics service 436 for processing. The microapp service may, for example, periodically cause active data to be pulled from the systems of record 426.

In some embodiments, the active data cache service 434 may be single-tenant and may store all configuration information and microapp data. It may, for example, utilize a per-tenant database encryption key and per-tenant database credentials.

In some embodiments, the credential wallet service 432 may store encrypted service credentials for the systems of record 426 and user OAuth2 tokens.

In some embodiments, the data integration provider service 430 may interact with the systems of record 426 to decrypt end-user credentials and write back actions to the systems of record 426 under the identity of the end-user. The write-back actions may, for example, utilize a user's actual account to ensure all actions performed are compliant with data policies of the application or other resource being interacted with.

In some embodiments, the analytics service 436 may process the raw events received from the microapp service 428 to create targeted scored notifications and send such notifications to the notification service 438.

In some embodiments, the notification service 438 may process any notifications it receives from the analytics service 436. In some implementations, the notification service 438 may store the notifications in a database to be later served in an activity feed. In other embodiments, the notification service 438 may additionally or alternatively send the notifications out immediately to the client 440 as a push notification to the user 424.

In some embodiments, a process for synchronizing with the systems of record 426 and generating notifications may operate as follows. The microapp service 428 may retrieve encrypted service account credentials for the systems of record 426 from the credential wallet service 432 and request a sync with the data integration provider service 430. The data integration provider service 430 may then decrypt the service account credentials and use those credentials to retrieve data from the systems of record 426. The data integration provider service 430 may then stream the retrieved data to the microapp service 428. The microapp service 428 may store the received systems of record data in the active data cache service 434 and also send raw events to the analytics service 436. The analytics service 436 may create targeted scored notifications and send such notifications to the notification service 438. The notification service 438 may store the notifications in a database to be later served in an activity feed and/or may send the notifications out immediately to the client 440 as a push notification to the user 424.

In some embodiments, a process for processing a user-initiated action via a microapp may operate as follows. The client 440 may receive data from the microapp service 428 (via the client interface service 414) to render information corresponding to the microapp. The microapp service 428 may receive data from the active data cache service 434 to support that rendering. The user 424 may invoke an action from the microapp, causing the resource access application 422 to send an action request to the microapp service 428 (via the client interface service 414). The microapp service 428 may then retrieve from the credential wallet service 432 an encrypted Oauth2 token for the system of record for which the action is to be invoked, and may send the action to the data integration provider service 430 together with the encrypted OAuth2 token. The data integration provider service 430 may then decrypt the OAuth2 token and write the action to the appropriate system of record under the identity of the user 424. The data integration provider service 430 may then read back changed data from the written-to system of record and send that changed data to the microapp service 428. The microapp service 428 may then update the active data cache service 434 with the updated data and cause a message to be sent to the resource access application 422 (via the client interface service 414) notifying the user 424 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistant through either the resource access application 422 or directly from another resource, such as Microsoft Teams. This feature may allow employees to work efficiently, stay organized, and deliver only the specific information they're looking for.

Mitigating Insecure Digital Storage of Sensitive Information

As described above, examples described herein are directed to mitigating insecure digital storage of sensitive information. Users may store passwords (or other sensitive information) in insecure storage applications such as a notepad, copy the stored passwords, and paste the copied passwords to the corresponding password entry fields. To mitigate this behavior, a computing device may detect a transfer of sensitive information. For example, the computing device may detect a copy event, identify the source application for the copy event, identify a paste event to a sensitive information field, identity a target for paste event, and send the collected information to an analytic server. The analytic server may generate a risk score based on the received data. The analytic server may further generate and transmit mitigation instructions (e.g., to lock a user account associated with a risky transfer behavior) to the computing device. In some instances, the computing device may automatically perform its own mitigation operations prior to receiving mitigation instructions from the analytic server. For example, if the transfer is to a highly sensitive application and from an insecure source, the computing device may automatically lock the account, transmit the collected information to the analytic server, and await further mitigation instructions from the analytic server.

Figure 5:
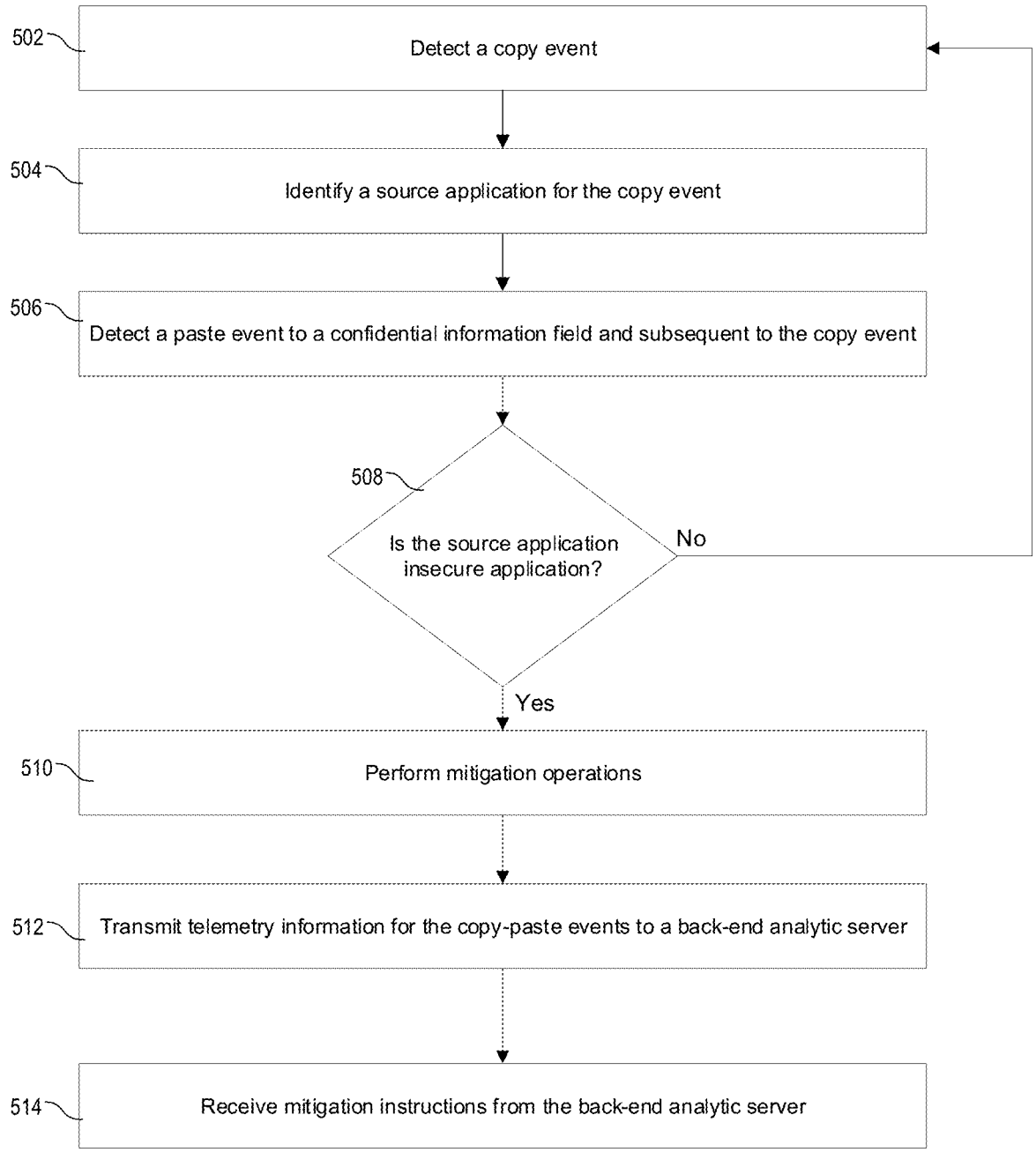
FIG. 5 depicts a flow diagram of an illustrative method of mitigating insecure digital storage of sensitive information.

FIG. 5 depicts a flow diagram of an illustrative method 500 of identification and mitigation of insecure storage of sensitive information. Although multiple computing devices (e.g., computing devices 103, 105, 107, 109 in FIG. 1; computing devices 201, 240, 206 in FIG. 2; computing devices 301, 302, 310, 311, 312, 313, 314 in FIG. 3; and/or computing device 402, 406, 412, 440 in FIGS. 4A-4C) may perform the steps of the method 500, the following details, for brevity, a single computing device performing all steps of the method 500. It should also be understood that the method 500 is merely illustrative, and other methods with alternative, additional, or fewer number of steps should be considered to be within the scope of this disclosure.

The method 500 may begin at step 502 when the computing device may detect a copy event. The computing device may detect the copy event using a copy listener. A copy listener may be a code that may be executed by the computing device (and/or any other remote device) that may execute in the background to detect a copy event (e.g., detect if there is a clipboard operation). The copy listener may be preset before the beginning of the method. The copy listener may invoke a system level application programming interface (API), an application level API, or a browser script (e.g., Javascript Document Object Model (DOM)) to detect the copy event. The code for the copy listener may include these invocations (e.g., API calls), and the computing device may select a portion (e.g., a sub-routine) of the code for a specific invocation. For example, if system level API calls are supported, the computing device may select system level API call sub-routine to be executed. As another example, if a browser is being used, the computing device may select a sub-routine to detect copy events in a browser script. It is therefore to be understood that a copy listener code may have different sub-routines for invoking different APIs and/or other processes to detect copy events at any level (e.g., system level, application level, or browser level, etc.).

At a next step 504, the computing device may identify a source application for the copy event. The source application may be the provider of the copied information for the copy event and the pasted information for the paste event. The computing device may identify the source application by, for example, determining which application last copied information to a clipboard (e.g., by invoking a system level API call such as GetClipboardOwner ( ) which returns the identification to the application) or by parsing a browser script (e.g., parsing Javascript DOM, which contains as embedded information, the name of source application).

At a next step 506, the computing device may detect a paste event subsequent to the copy event, wherein the paste event is to a field or document (e.g., sensitive information field). The sensitive information field may be a field to enter login credentials (e.g., passwords) within a login window. For this detection, the computing device may first identify the sensitive information field (e.g., field identifier indicating "password" or field input type being a password) and preset a paste listener for the field. The computing device may identify the sensitive information using techniques such analyzing user interface of the window (e.g., the field labeled or otherwise identified as "password," the field being below a "username," etc.), parsing a browser script (e.g., the browser indicating <input type="password," etc.), and/or any other types of techniques or heuristics. The aforementioned paste listener may detect any type of paste event to the sensitive information field. For instance, the paste listener may detect that information was transferred to the sensitive information field from another application. Alternatively or additionally, the computing device may detect a change in a window (e.g., an addition of hidden characters "*******" a field). This detection is based on comparing the values of the window between transfer operations. Such comparison will allow the computing device to determine if the hidden characters were added within the window, thus indicating a transfer of sensitive information to the window.

At a next step 508, the computing device may determine whether the source application is an insecure application. For example, the computer may compare the identified source application with a list of pre-configured trusted and secure applications. If the source application is not in this list, the computing device may determine that the source application is an insecure application. If the source application is a secure application (e.g., a password manager), the computing device may go back and execute step 502 to detect another copy event. A secure source application may pose a minimal security risk as it may be password protected, may have other security features, or may be specifically configured to maintain the security of sensitive information. If the source application is an insecure application (e.g., a notepad), the computing device may execute the next step 510 for further risk analysis.

At a next step 510, the computing device may perform mitigation operations. The mitigation operations may attempt to prevent and/or minimize the risk of transfer of sensitive information from an insecure application to a sensitive information field. For instance, if the field is for a highly sensitive application, the computing device may automatically lock access to the highly sensitive application or the lock the user's account. In other instances, the computing device may generate a warning for the user and/or generate a prompt to reset the sensitive information. Other examples of mitigation operations are described in association with step 708 of the method 700 below. The computing device may perform these mitigation operations prior to or in parallel with sending telemetry information (step 512) and prior to receiving mitigation instructions (step 514). The computing device may therefore take some remedial measures to mitigate the risk without waiting for the mitigation instructions from the analytic server. The remedial measures may be to counteract relatively higher level of risks, e.g., an admin user copying and pasting a password, in which case the computing device may lock the admin user account to prevent further risk to the enterprise system.

At the next step 512, the computing device may transmit data (e.g., telemetry data) for the copy-paste events to a remote computing device (e.g., a back-end analytic server). The telemetry data, containing information locally gathered by the computing device, may allow the analytic server to further analyze the risk associated with the copy-paste events and provide further mitigation instructions. The telemetry data may include for example, identification of the source application, identification of a target application containing the sensitive information field, identification of the user associated with the computing device, time stamps for the copy and paste events, type of paste information, type of the computing device (e.g., bring your own device (BYOD) type or managed mobile device type) and/or any other type of information.

At a next step 514, the computing device may receive mitigation instructions from a remote computing device (e.g., a back-end analytic server). The analytic server may generate a score (e.g., risk score) based on the data (e.g., telemetry data) received from the computing device. Based on the risk score and the telemetry data, the analytic server may also generate instructions to mitigate the risk of loss of confidential or otherwise sensitive data. The mitigation instructions may include, for example, instructions to generate a warning for the user, instructions to lock an account associated with the user, instructions to prompt the user to change login credentials (e.g., password), and/or any other type of mitigation instructions.

Method 500 may therefore attempt to mitigate the risk associated with storing sensitive information in insecure applications and transferring the insecurely stored sensitive information to a sensitive information field. The risk mitigation may be performed through providing escalating warning to the users or eventually locking the account of the user. The risk mitigation measures may be tailored based on, for example, severity of the risk or the level of privilege associated with the user. Examples of policies for tailoring the risk mitigation measures are described below in association with step 710 of method 700. Furthermore, the risk identification and mitigation measures are based on source applications, target applications, copy events, and paste events—the measures do not need to know and/or store the sensitive information.

Figure 6:
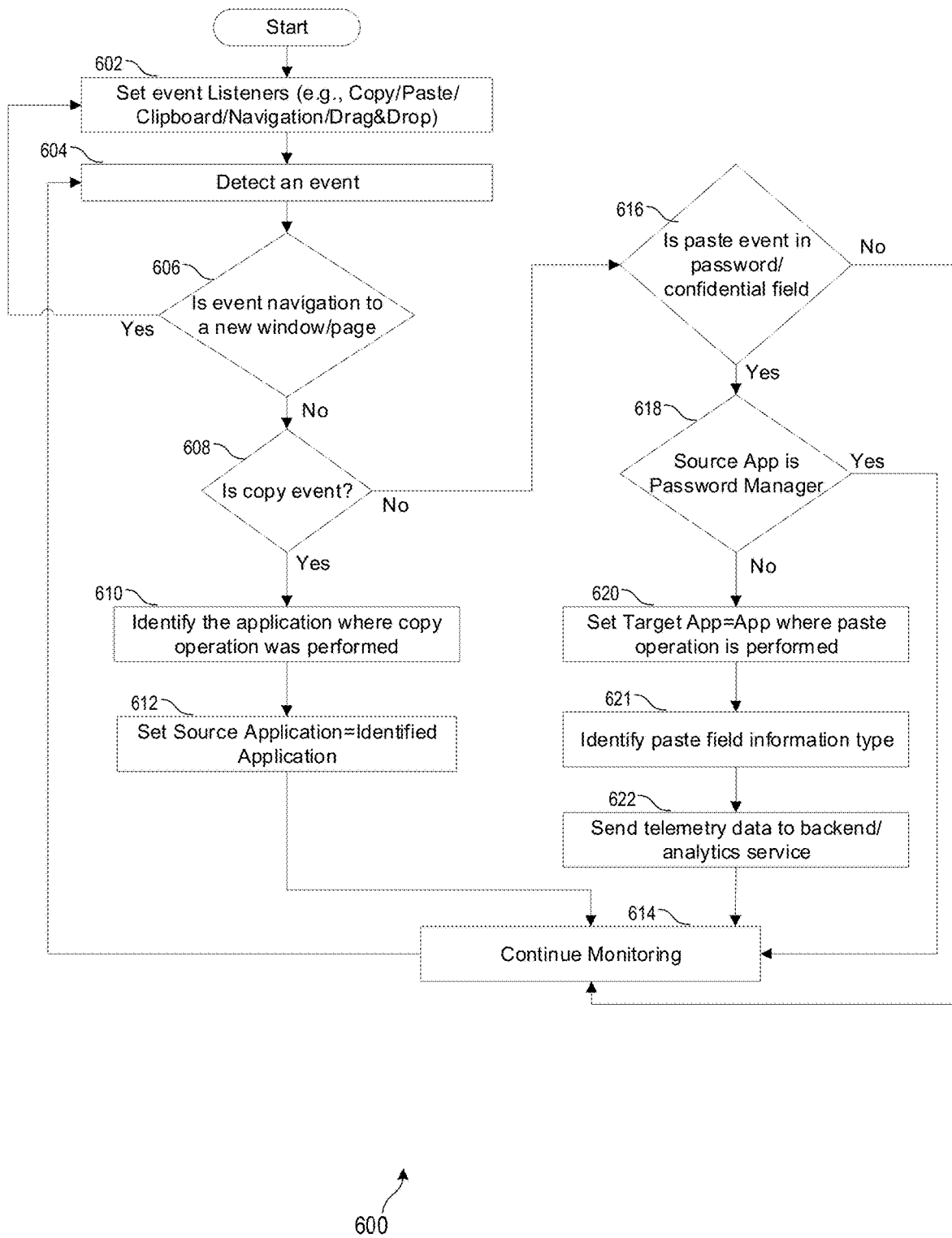
FIG. 6 depicts a flow diagram of another illustrative method of mitigating insecure digital storage of sensitive information.

FIG. 6 depicts a flow diagram of an illustrative method 600 of identification and mitigation of insecure storage of sensitive information. Although multiple computing devices (e.g., computing devices 103, 105, 107, 109 in FIG. 1; computing devices 201, 240, 206 in FIG. 2; computing devices 301, 302, 310, 311, 312, 313, 314 in FIG. 3; and/or computing device 402, 406, 412, 440 in FIGS. 4A-4C) may perform the steps of the method 600, the following details, for brevity, a single computing device performing all steps of the method 600. It should also be understood that the method 600 is merely illustrative, and other methods with alternative, additional, or fewer number of steps should be considered to be within the scope of this disclosure.

The method 600 may begin at step 602, when the computing device may set event listeners. An example of an event listener may be a copy (which is an example of an event) listener. For instance, the computing device may be enterprise server that may set the event listeners at the client devices in communication with the enterprise server. In other instances, the computing device may be a client device that may set the event listeners for the applications and operations within the client device. In yet another instances, the enterprise server and the client computing device may communicate and collaborate to set the event listeners. In some examples, the computing device may set the listeners for local applications. The computing device may also set the listeners within virtual sessions for instances where the users may copy from local application and paste the copied information into the virtual session, or alternatively copy from the virtual session and paste the copied information into the local application. The event listeners may be at a system level (e.g., at the operating system level) or at a specific application level. The event listeners may be triggered upon a detection of the corresponding event, e.g., a copy listener may be triggered when a copy event is detected.

In some examples, the computing device may set the event listers using system level APIs and/or using related application specific events. For instance, the computing device may use the SetClipboardViewer( ), AddClipboardFormatListener ( ) APIs to detect if anything has been copied to a clipboard in a device. The clipboard copying may be across different sessions, for instance, data may be copied from a first session to be pasted into a second session. For web or Software as a Service (SaaS) applications, the computing device may use browser copy events. A browser copy event may be set at a window level (e.g., to detect any information is copied from a window), document level (e.g., to detect if any information is copied from a document), or element level (e.g., to detect if any information is copied from an element or a field). In a browser setting, the computing device may detect web-navigation, such as loading of a new page, element within the page, or a window to set an event listener for the new page, new element, or new window. To detect the web navigation or any other changes (e.g., change in field) in a browser setting, the computing device may utilize event listeners such as webNavigation (detecting browser events such as loading) or mutationObserver (detecting changes the scripts for browser rendering, e.g., Javascript DOM). In some examples, the computing device may use image or video processing (or generally computer vision) of the renderings at the display of the computing device as event listeners to detect one or more events. Another example of an event listener set by the computing device may be a drag and drop listener. The drag and drop listener may detect when information is selected (e.g., in a source application) and dragged to a target field (e.g., a sensitive information field in a target application).

In a next step 604, the computing device may detect an event. The computing device may detect the event using the event listeners set in step 602. For instance, an event listener may determine that a change has been made to the operating system clipboard or determine that a change has been made to a document. This determination may be based on, for example, the computing device using API calls such as SetClipboardViewer( ), AddClipboardFormatListener ( ) and/or using mutationObserver for Javascript DOM. In other instances, the computer may use image/video processing techniques (or generally computer vision) to detect the event. Based on one or more such determinations made by the event listeners, the computing device may detect the event. Some non-limiting examples of the detected events include copy event, paste event, clipboard event, or navigation event.

In a next step 606, the computing device may determine if the detected event is a navigation to a new window or page. The computer may make this determination using a navigation listener set up in step 602. The navigation listener may invoke system level APIs or parse browser script to determine if the user has opened a new window or a new page. If the determination is at step 606 is yes, the method 600 may flow back to step 602 where the computing device may set event listeners for the new window or page. If the determination at step 606 is no, the method 600 may flow to a next step 608 to determine if the detected event is a copy event. If the determination at step 608 is yes, the computing device may execute a next step 610. If the determination at step 608 is no, the computing device may execute step 616.

In the next step 610, the computing device may identify the application where the copy operation (corresponding to the copy event) was performed. For example, the computing device may use a system level API call GetClipboardOwner ( ) to identify the window that last placed data in the clipboard. Using the information about the window, the computing device may identify the details of the application that the data originated from and/or identify the details of the process of copying the data to the clipboard. For web-applications (e.g., in a browser setting), the computing device may identify the source application using domain name, universal resource locator (URL) name, etc., which may be accessible using the script used by the browser to render its content. For instance, computing device may use the Javascript DOM used by an enterprise browser, embedded browser, secure browser, and/or any other type of web navigation application.

In a next step 612, the computing device may set the source application (e.g., where the information was copied from) as the identified application for the subsequent steps. More particularly, the computing device may update processes being executed for the method 600 and/or the data records being used by the method 600 that the identified application is the source application for a potential paste event in the subsequent steps. Furthermore, the computing device may generate/update telemetry data indicating that the identified application is the source application of the copied information. In a next step 614, the computing device may continue monitoring for a next event.

If the computing device determines at step 608 that the detected event is not a copy event, the computing device may execute the step 616 to determine if the detected event is a paste event in a password field (and/or any other type of sensitive information field). To make this determination, the computing device may, in some examples, use a paste listener for password fields. In these examples, the computing device may analyze the user interface of the application to identify the password field within the application to set a paste listener for the password field.

The computing device may analyze user interfaces of an application by using user interface automation or user interface accessibility APIs for MS-Windows applications. For web applications, the computing device may analyze the user interfaces by using DOMs. Within the analyzed user interfaces, the computing device may identify passwords by using some of the non-limiting techniques described here. For a web page, the password field of a logical page may be indicated by an input type in the script (e.g., Javascript DOM), such as <input type="password.". For non-web applications, the computing device may determine control type or input type of field. In the case of Windows Presentation Foundation (WPF)/Extensible Application Markup Language (XAML) applications, the computing device may determine a <PasswordBox> control type for a field. The computing device may use similar control/input types to identify the password fields for any other windows. In addition to or as an alternate to the aforementioned techniques, the computing device may use heuristics such as using the labels of the fields. A field may have labels such as "username," "password," "login," or "sign-in." The title of the window may be "login page," or "sign-in page." The computer may use these pieces of information or any other type of heuristic to identify the password fields. An example of such heuristic may be the orientation of an entry field compared to a username field. If such field is below the entry field for the username field, the field may be a password entry field. The paste listener for these identified fields may be, for example, element.addEventListener('paste', . . . ).

In other examples, the computing device may use paste listener for window (using, e.g., window.addEventListener ( )) or a document (using, e.g., document.addEventListener( )) to detect if a paste event is in a password field. The computing device may use the paste listener for window in addition to or as an alternate to the paste listener for password fields. A paste listener for window or document may compare values before and after a paste operation to the window. For instance, a paste operation may add a value of "*****" within the password field of the window. To detect this addition (or any other changes made by pasting information in a password field), the computing device may store value for the input elements in the window before the paste event is detected. Upon detection of the paste event, the computing device may fetch the content of the input elements again. The computing device may identify if any input element changed with addition of hidden characters "*****," thereby indicating a paste operation for a particular field (e.g., password field).

If the computing device determines that the paste event is not in a password field, the computing device may execute step 614 to continue monitoring for the next event. A paste event not in a password field may not necessarily pose a security risk. However, if the computing device determines that the paste event is in a password field, the computing device may execute step 618 of the method to determine if the source application (set by the computing device in step 612) is a password manager. If the computing device determines that the source application is a password manager, the copy-paste operations may not necessarily pose a security risk as the user may be using the a secure application (such as a password manager) to store the passwords. The computing device may be pre-configured with a list of trusted applications such as a password manager, and the computing device may compare the identified source application with the list of trusted application to determine if the source is application is a password manager or a trusted application.

However, if the computing device determines that the source application is not a password manager, the computing device may execute step 620 to set the target application as the application where the paste operation is performed. More particularly, the computing device may update processes being executed for the method 600 and/or data records associated with the method 600 that the target application for the current iteration is where the copied information was pasted to. Furthermore, the computing device may also update telemetry data indicating the application where the paste operation is performed as a target application. Therefore, steps 612 and 620 may generate a source application-target application pair for further analysis of the risk associated with information being transferred from the source application to the target application.

In a next step 621, the computing device may identify a type of information for a given field (e.g., a paste field information type in the sensitive information field). The paste information type may include, for example, password, social security number (SSN), date of birth (DOB), and/or any other type of sensitive information. The computing device may identify the paste information type using heuristics such as identifying the label of the field (e.g., labeled as "password," "social security number," "SSN," and/or any other type of label). The computing device may identify the labels and/or use any other heuristic through techniques such as parsing of a browser script, computer vision, and/or any other techniques.

In step 622, the computing device may send the telemetry data (e.g., the source application/process/domain/URL name, the target application/process/domain/URL name, username, paste information type, device type) to a remote computing device (e.g., backend/analytics service) for further analysis. The telemetry data or the data used for the risk analysis does not use the actual sensitive information. For example, there is no comparison of the actual passwords. The analysis may generally be based on the what source the sensitive information was copied from, what target the sensitive information was pasted to, type of the sensitive information, type of the user, type of the computing device, and/or other features but not the sensitive information itself. The computing device and therefore the analytic server may not have to know or process the actual sensitive information thereby making the method 600 more secure. The computing device may then continue monitoring (step 614) for the next event to trigger a next flow of the method 600. As described above, the computing device may also perform mitigation operations based on the collected data, e.g., lock the account if a highly sensitive password is copied from an insecure application.

Figure 7:
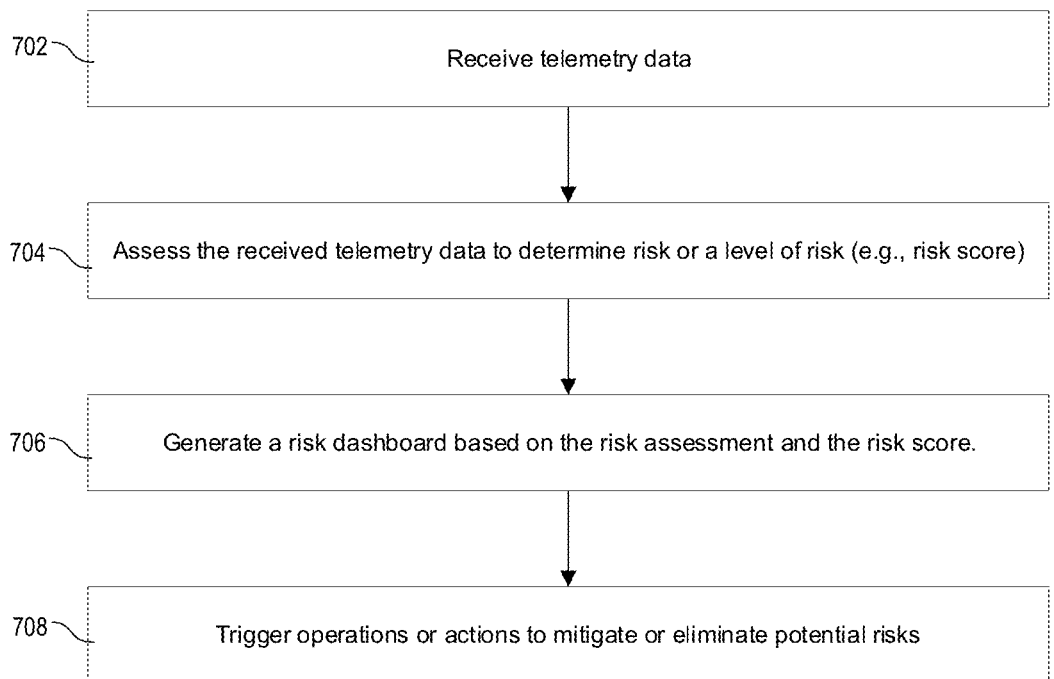
FIG. 7 depicts a flow diagram of yet another illustrative method of mitigating insecure digital storage of sensitive information.

FIG. 7 depicts a flow diagram of an illustrative method 700 of identification and mitigation of insecure storage of sensitive information. Although multiple computing devices (e.g., computing devices 103, 105, 107, 109 in FIG. 1; computing devices 201, 240, 206 in FIG. 2; computing devices 301, 302, 310, 311, 312, 313, 314 in FIG. 3; and/or computing device 402, 406, 412, 440 in FIGS. 4A-4C) may perform the steps of the method 700, the following details for brevity a single computing device performing all steps of the method 700. For instance, the computing device may be a remote computing device (e.g., back-end analytic server). It should also be understood that the method 700 is merely illustrative, and other methods with alternative, additional, or fewer number of steps should be considered to be within the scope of this disclosure.

The method 700 may begin at step 702, where the computing device may receive data (e.g., telemetry data). The computing device may receive the telemetry data from client or any other type of end-point devices. The telemetry data received by the computing device may include, for example: source application name, source process name, source domain name, source URL, username value, target application name, target process name, target domain name, target URL, or paste information type.

In a next step 704, the computing device may perform assess or otherwise evaluate the received telemetry data to determine risk or a level of risk of the associated operation (e.g., a copy and/or paste operation). The assessment may be based on a plurality of factors. For instance, password copied from a notepad may likely be a personal password and may pose a lower amount of risk compared to a password copied from a team portal (e.g., Slack, Teams), which may likely be a password for team access to secure resources within a system. A username field containing a highly sensitive or critical username (e.g., user with admin or higher privileges) with a stored password may pose a higher risk than a username field with less sensitive or lower privileged username. The computing device may also use the paste information type to perform the risk assessment. For instance, a SSN copied from an insecure application may pose a higher risk than a copied password—a password can be changed easily but it may be inconvenient and cumbersome to change a SSN.

The computing system may also use the type of target application to assess risk. A higher security risk is associated with a target application that requires login credentials, such as username and password, compared to other target applications such as a notepad. A paste operation to a target application requiring login credentials has a higher likelihood of the actual login credentials being copied and pasted, thereby presenting a higher level of risk. However, information being pasted to a notepad may not be sensitive information and therefore presents a lower level of risk. The computing system may also use other data associated with the user account for risk assessment. For instance, a user with a history of copying and pasting passwords and/or having any other high risk behavior may be associated with a higher risk compared to a user without a history of such high risk behavior. The computer system may also perform the risk assessment based on other the target application requires a multi-factor authentication—an application requiring a multi-factor authentication may be associated with a higher risk that an application not requiring such multi-factor authentication.

The computing device may generate a score (e.g., risk score) based on the risk assessment. It should however be understood that the aforementioned risk assessment factors and the metric to generate the score are merely for illustrations and should not be considered limiting. To generate the score, the computing device may assign a weight to a corresponding risk assessment factor (e.g., source application type). The weight may indicate the relative impact of the factor compared to other factors on the overall score. A non-limiting example of assigning weights to the risk assessment factors is shown in Table 1.

TABLE 1

Weights Assigned to Risk Assessment Factors

| Risk assessment Factor | Factor Weight |
|---|---|
| Source Application Type | 10 |
| Username account Attributes (e.g., whether the user is an admin) | 8 |
| Target Application Type | 7 |
| User Account | 3 |
| Paste Information Type | 15 |

For each factor, there may be different attributes with corresponding factor values. The computing device may then select a value (e.g., factor value) for a detected attribute for a risk assessment factor. A non-limiting example of attributes for Source Application Type risk assessment factor and the factor values for the attributes is shown in Table 2. As shown in Table 2, the factor value for the Source Application Type being a messaging app such as Slack may have a factor value of 10, indicating a higher risk. The factor value for the Source Application Type being Notes may have a factor value of 6, indicating a lower risk. As another non-limiting example, Table 3 shows factor values for paste information type. A SSN may be highly sensitive because it is generally more immutable than a password or a credit card number as reflected in Table 3.

TABLE 2

Source Application Type Factor Values

| Source Application Type Attribute | Source Application Type Factor Value |
|---|---|
| Messaging App such as slack/teams | 10 |
| Unknown App or New app | 9 |
| Notepad | 8 |
| Notes | 6 |

TABLE 3

Paste Information Type Factor Values

| Paste Information Type Attribute | Paste Information Type Factor Value |
|---|---|
| SSN | 10 |
| Password | 8 |
| Credit card | 5 |

Using the factor values and the weights, the computing device may calculate a risk score (e.g., a password copy-paste risk score) using the following non-limiting expression.

$$\text{Risk Score} = \Sigma \text{Weight}_i * \text{FactorValue}_i / \Sigma \text{Weight}_i$$

It should be understood that the aforementioned risk score calculation is merely for illustration and the computing device may use alternative and additional expressions for the risk score calculation. It should further be understood the computing device may change the weights (e.g., shown in Table 1) and the factor values (e.g., shown in Table 2) based on historical information of risk score calculation.

Figure 8:
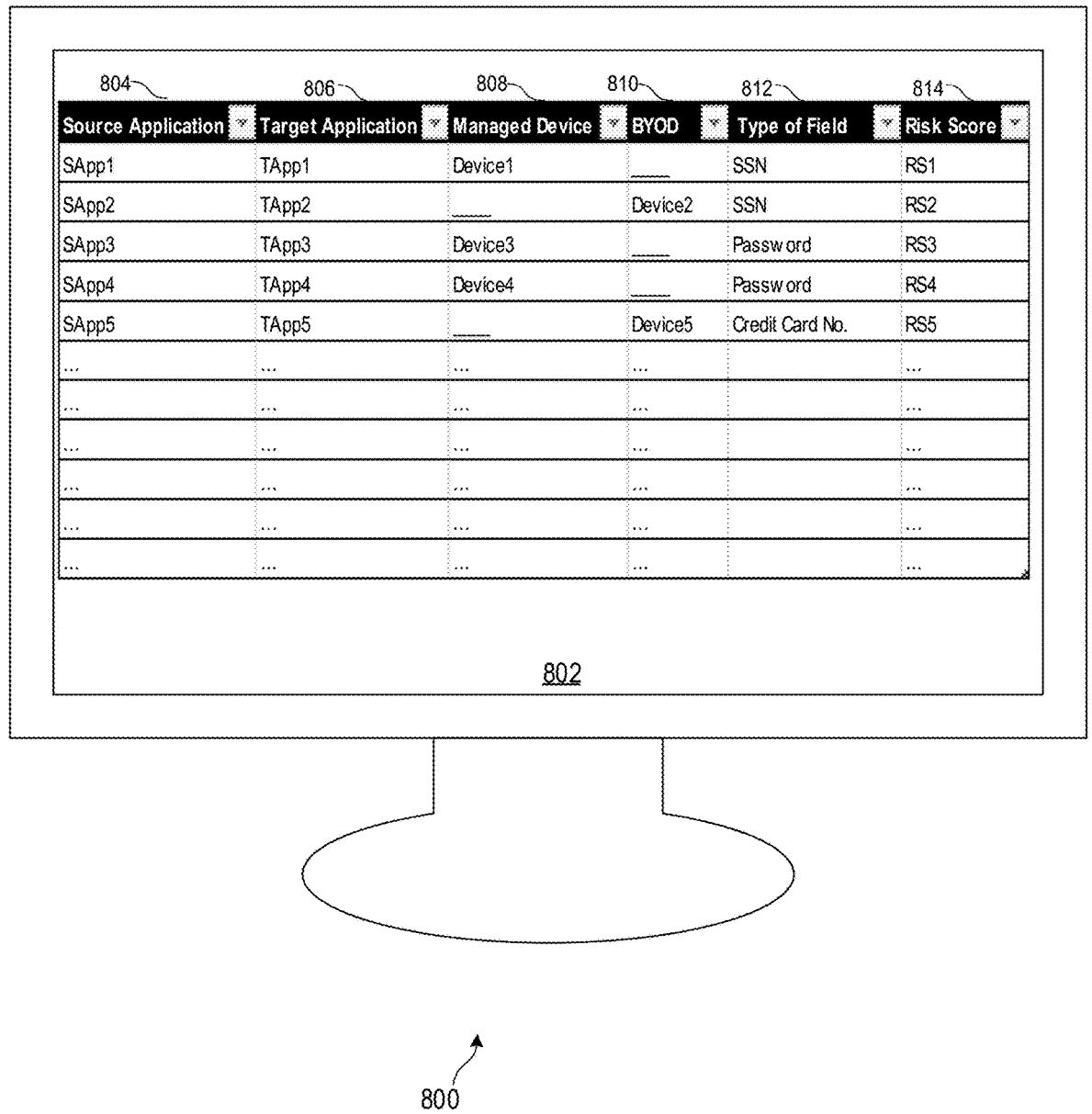
FIG. 8 depicts an illustrative dashboard generated for an admin user to provide a unified view of risky copy-paste behavior within an enterprise computer system.

At next step 706, the computing device may generate a risk dashboard based on the risk assessment and the risk score. The dashboard may allow a user (e.g., an admin user) to view risk scores for a plurality of client users. FIG. 8 depicts an example of a dashboard 800 generated by a computing device on a user interface 802. The dashboard 802 may comprise, for example, a table presenting risk scores and the information corresponding to the risk scores. For instance, the example dashboard may comprise a table with a source application column 804, a target application column 806, a managed device column 808 (a managed device may have, for example, a closed environment comprising software and other installations by the enterprise computer system), a bring your own device (BYOD) column 810, a paste type of field column 812, and a risk score column 814.

The source application column 804 may indicate the source application of a given operation or event. The source application may be the application from which information (e.g., password) may have been copied or otherwise transferred from. The target application column 806 may indicate the target application of the given operation or the event. The target application may be the application to which the copied information (e.g., a copied password) may have been pasted. The managed device column 808 may identify the client devices managed and/or provided by an enterprise computer system. The managed devices may have a closed environment comprising software and other installations by the enterprise computer system. The BYOD column may identify the client devices provided by individual users but with authorization to access at least a part of the enterprise computer system. The BYOD devise may have an open environment containing secure software allowing the user to access the enterprise computer system and other personal installations for the user. The type of field column 812 may indicate the type of field (e.g., SSN, password, or credit card number) that the copied information was pasted. The risk score 814 may indicate the risk score of the combination of the corresponding: source application (as indicated by the source application column 804), target application (as indicate by the target application column 806), managed device (as indicated by the managed device column 808), BYOD (as indicated by the BYOD column 810), and paste information type (as indicated by the type of field column 812).

The computing device may generate the dashboard 800 to allow the admin user to take a snapshot view of risk statuses associated with different devices and different behavior within the enterprise system. In some examples, the computing device may color code the rows based on the differing levels of risk. For instance, the computing device may code high risk rows as red, medium risk rows as yellow, and minimal risk rows as green. It is to be understood that different types of dashboard displays and visual optimization thereof should be considered within the scope of this disclosure. The dashboard 800 may also allow the admin users to see top offending users, top source applications associated with the risky copy-paste behavior, top target applications associated with the risky copy-paste behavior, top admin/ privileged accounts associated with the risky copy-paste behavior. The dashboard 800 may also allow the admin user to sort the information based on various filtering criterial such as the risk score, data-time range, and/or any other filtering criteria. Overall, the dashboard 800 may allow the admin user to have a unified view of the password copy-paste risk within the enterprise computer system.

Referring back to FIG. 7, the computing device may at a next step 708 trigger operations or actions to mitigate or eliminate any potential risks associated with a given event. The risk mitigation operations or actions may be based on different policies. The policies may be configurable, e.g., automatically configurable based on historic data. For instance, the computing device may trigger mitigation operation based on a policy that if a source application is Slack or Teams, the username that was used on the target application should be blocked. This policy may prevent insider threat and misuse of credentials. This policy may therefore require password to be changed before the username is unblocked. The computing device may accordingly generate instructions for blocking the user account and for requiring a password change.

The policy for triggering the mitigation operations may also be based on privileges associated with a user account. For instance, a user account may be associated with an admin user or a user with higher access privileges. For users with higher privileges, the computing device may trigger locking of the account and generating a warning for the users for the risky copy-paste behavior. For users with lower privileges (general users and not admin users), the computing device may generate a warning about the risky password copy-paste behavior and not lock the account as the risk may be minimal. The policy may also be based on the type of target application. For instance, the computing device may trigger locking of a user account if the target application where the password was pasted is a sensitive application, e.g., a human resources application used by a human resources employee. In other instances, the target application may not be sensitive, e.g., a general personal application used by the user. In these instances, the computing device may not lock the user account but generate a warning for the user about the risky password copy-paste behavior.

The policy may also be based on the type of user account. For instance, if the computing device detects the risky password copy-paste behavior with users associated with a finance department, the computing device may lock the corresponding user account. However, if the computing device detects the risky password copy-paste behavior in a building maintenance department, the computing device may not lock the user account and merely generate a warning.

The policy may also be based on the number of occurrences of the risky behavior. For instance, the computing device may merely provide a simple warning about the risky behavior for a first occurrence. For a second occurrence, the computing device may provide an escalated warning (e.g., warning to lock the user account). For a third occurrence, the computing device may lock the user account.

It should be understood that the risk mitigation operations described above are merely examples and should not be considered limiting. In addition to warning the users and/or locking their accounts for risky password copy/paste behavior, the computing device may also automatically reset password, notify supervisor of the users, and/or perform other risk mitigation operations.

The following paragraphs (M1) through (M12) describe examples of methods that may be implemented in accordance with the present disclosure.

(M1) A method comprising detecting, by a computing device, a transfer of data from one application to another, the transfer including a field to receive sensitive information; determining, by the computing device, that the one application of the transfer is insecure; and in response to the computing device determining that the one application is insecure: providing, by the computing device, an action so as to mitigate use of sensitive information within the one application.

(M2) A method may be performed as described in paragraph (M1), further comprising transmitting, by the computing device to an analytic server, information for the transfer, identifying: a user associated with the computing device, the one application, the another application for the, type of the field to receive the sensitive information, and type of the computing device; and receiving, by the computing device from the analytic server, an indication of the action based on the transmitted information.

(M3) A method may be performed as described in paragraph (M1) through (M2), wherein the transfer of data comprises a copy event and a paste event.

(M4) A method may be performed as described in any of paragraphs (M1) through (M3), further comprising: setting event listeners for detecting one or more events in the computing device, wherein the event listeners comprise at least one of a copy listener, a paste listener, a clipboard listener, a drag and drop listener, or a navigation listener.

(M5) A method may be performed as described in any of paragraphs (M1) through (M4), wherein the detecting the transfer of data further comprises: identifying the field to receive the sensitive information within a window or a document; and setting a paste listener for the field to receive the sensitive information.

(M6) A method may be performed as described in any of paragraphs (M1) through (M5), wherein the detecting the transfer of data further comprises: setting a paste listener for a window or a document; and using the paste listener, detecting that a field within the window or the document has been modified by adding hidden characters.

(M7) A method may be performed as described in any of paragraphs (M1) through (M6), wherein the determining that the one application of the transfer is insecure further comprises: identifying the one application by retrieving identification of an application that last placed data in a clipboard.

(M8) A method may be performed as described in any of paragraphs (M1) through (M7), wherein the determining that the one application of the transfer is insecure further comprises: identifying the one application by retrieving domain name of a web application using a browser script.

(M9) A method comprising: receiving, by an analytic server from a client computing device, data associated with a transfer of sensitive information at the client computing device, the data comprising identification of: a user associated with the client computing device, a source application for the transfer, a target application for the transfer, information type of the sensitive information, and client computing device type; generating, by the analytic server, a risk score associated with the transfer based on the received data; generating, by the analytic server, one or more actions based on the generated risk score and the received data; and transmitting, by the analytic server to the client computing device, the one or more action.

(M10) A method may be performed as described in paragraph (M9), further comprising: generating for display, by the analytic server, a dashboard view of a plurality of risk scores for a plurality of users including the risk score for the user.

(M11) A method may be performed as described in any of paragraphs (M9) through (M10), wherein the one or more actions comprise at least one of: instructions to generate a warning for a user; instructions to lock the user's account; instructions to generate a prompt for the user to change login credentials.

(M12) A method may be performed as described in any of paragraphs (M9) through (M11), wherein the one or more actions comprise a first action and a subsequent second action, the method further comprising: transmitting, by the analytic server to the client computing device, the first action in response to determining that the user has performed a first threshold number of transfer of sensitive information; and transmitting, by the analytic server to the client computing device, the subsequent second action in response to determining that the user has performed a second threshold number of transfer of sensitive information, wherein the second threshold is higher than the first threshold.

The following paragraphs (A1) through (A12) describe examples of apparatuses that may be implemented in accordance with the present disclosure.

(A1) An apparatus comprising at least one processor; memory storing instructions that, when executed by the at least one processor, cause the apparatus to: detect a transfer of data from one application to another, the transfer including a field to receive sensitive information; determine that the one application of the transfer is insecure; in response to the processor determining that the one application is insecure: provide an action so as to mitigate use of sensitive information within the one application.

(A2) An apparatus as described in paragraph (A1), wherein the memory further stores instructions that when executed by the at least one processor, cause the apparatus to: transmit to an analytic server, information identifying: a user associated with apparatus, the one application, the another application, type of the field to receive the sensitive information, and type of the apparatus; receive from the analytic server, an indication of the action based on the transmitted information.

(A3) An apparatus as described in any of the paragraphs (A1) through (A2), wherein the transfer of data comprises a copy event and a paste event.

(A4) An apparatus as described in any of paragraphs (A1) through (A3), wherein the memory further stores instructions that when executed by the at least one processor, cause the apparatus to: set event listeners for detecting one or more events in the apparatus, wherein the event listeners comprise at least one of a copy listener, a paste listener, a clipboard listener, a drag and drop listener, or a navigation listener.

(A5) An apparatus as described in any of paragraphs (A1) through (A4), wherein to detect the transfer of data, the memory further stores instructions that when executed by the at least one processor, cause the apparatus to: identify the field to receive the sensitive information within a window or a document; and set a paste listener for the field to receive the sensitive information.

(A6) An apparatus as described in any of paragraphs (A1) through (A5), wherein to detect the transfer of data, the memory further stores instructions that when executed by the at least one processor, cause the apparatus to: set a paste listener for a window or a document; and using the paste listener, detect that a field within the window or the document has been modified by adding hidden characters.

(A7) An apparatus as described in any of paragraphs (A1) through (A6), wherein to determine that the one application of the transfer is insecure, the memory further stores instructions that when executed by the at least one processor, cause the apparatus to: identify the one application by retrieving identification of an application that last placed data in a clipboard.

(A8) An apparatus as described in any of paragraphs (A1) through (A7), wherein to determine that the one application is insecure, the memory further stores instructions that when executed by the at least one processor, cause the apparatus to: identify the one application by retrieving domain name of a web application using a browser script.

(A9) An apparatus comprising at least one processor; memory storing instructions that, when executed by the at least one processor, cause the apparatus to: receive, from a client computing device, data associated with a transfer of sensitive information at the client computing device, the data comprising identification of: a user associated with the client computing device, a source application for the transfer, a target application for the transfer, information type of the sensitive information, and client computing device type; generate a risk score associated with the transfer based on the received data; generate one or more actions based on the generated risk score and the received data; and transmit to the client computing device, the one or more action.

(A10) An apparatus as described in paragraph (A9), wherein the memory further stores instructions that when executed by the at least one processor, cause the apparatus to: generate for display a dashboard view of a plurality of risk scores for a plurality of users including the risk score for the user.

(A11) An apparatus as described in any of the paragraphs (A9) through (A10), wherein the one or more actions comprise at least one of: instructions to generate a warning for a user; instructions to lock the user's account; or instructions to generate a prompt for the user to change login credentials.

(A12) An apparatus as described in any of the paragraphs (A9) through (A11) wherein the one or more actions comprise a first action and a subsequent second action, wherein the memory further stores instructions that when executed by the at least one processor, cause the apparatus to: transmit to the client computing device, the first action in response to determining that the user has performed a first threshold number of transfer of sensitive information; and transmit to the client computing device, the subsequent second action in response to determining that the user has performed a second threshold number of transfer of sensitive information, wherein the second threshold is higher than the first threshold.

The following paragraphs (CRM1) through (CRM12) describe examples of computer-readable media that may be implemented in accordance with the present disclosure.

(CRM1) A non-transitory computer-readable medium storing instructions that, when executed, cause a system to: detect a transfer of data from one application to another, the transfer including a field to receive sensitive information; determine that the one application of the transfer is insecure; in response to the processor determining that the one application is insecure: provide an action so as to mitigate use of sensitive information within the one application.

(CRM2) A non-transitory computer-readable medium as described in paragraph (CRM1) wherein the instructions, when executed, cause the system to: transmit to an analytic server, information identifying: a user associated with apparatus, the one application, the another application, type of the field to receive the sensitive information, and type of the apparatus; receive from the analytic server, an indication of the action based on the transmitted information.

(CRM3) A non-transitory computer-readable medium as described in any of the paragraphs (CRM1) through (CRM2), wherein the transfer of data comprises a copy event and a paste event.

(CRM4) A non-transitory computer-readable medium as described in any of paragraphs (CRM1) through (CRM3), wherein the instructions, when executed, cause the system to: set event listeners for detecting one or more events in the apparatus, wherein the event listeners comprise at least one of a copy listener, a paste listener, a clipboard listener, a drag and drop listener, or a navigation listener.

A non-transitory computer-readable medium as described in any of paragraphs (CRM1) through (CRM4), wherein to detect the transfer of data, the instructions, when executed, cause the system to: identify the field to receive the sensitive information within a window or a document; and set a paste listener for the field to receive the sensitive information.

(CRM6) A non-transitory computer-readable medium as described in any of paragraphs (CRM1) through (CRM5), wherein to detect the transfer of data, the instructions, when executed, cause the system to: set a paste listener for a window or a document; and using the paste listener, detect that a field within the window or the document has been modified by adding hidden characters.

(CRM7) A non-transitory computer-readable medium as described in any of paragraphs (CRM1) through (CRM6), wherein to determine that the one application of the transfer is insecure, the instructions, when executed, cause the system to: identify the one application by retrieving identification of an application that last placed data in a clipboard.

(CRM8) A non-transitory computer-readable medium as described in any of paragraphs (CRM1) through (CRM7), wherein the instructions, when executed, cause the system to: identify the one application by retrieving domain name of a web application using a browser script.

(CRM9) A non-transitory computer-readable medium storing instructions that, when executed, cause a system to: receive, from a client computing device, data associated with a transfer of sensitive information at the client computing device, the data comprising identification of: a user associated with the client computing device, a source application for the transfer, a target application for the transfer, information type of the sensitive information, and client computing device type; generate a risk score associated with the transfer based on the received data; generate one or more actions based on the generated risk score and the received data; and transmit to the client computing device, the one or more action.

(CRM10) A non-transitory computer-readable medium as described in paragraph (CRM9) wherein the instructions, when executed, cause the system to: generate for display a dashboard view of a plurality of risk scores for a plurality of users including the risk score for the user.

(CRM11) A non-transitory computer-readable medium as described in any of the paragraphs (CRM9) through (CRM10), wherein the one or more actions comprise at least one of: instructions to generate a warning for a user; instructions to lock the user's account; or instructions to generate a prompt for the user to change login credentials.

(CRM12) A non-transitory computer-readable medium as described in any of paragraphs (CRM1) through (CRM3), wherein the one or more actions comprise a first action and a subsequent second action, wherein the instructions, when executed, cause the system to: transmit to the client computing device, the first action in response to determining that the user has performed a first threshold number of transfer of sensitive information; and transmit to the client computing device, the subsequent second action in response to determining that the user has performed a second threshold number of transfer of sensitive information, wherein the second threshold is higher than the first threshold.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   detecting, by a computing device, a transfer of data from one application to another, the transfer including a field to receive sensitive information, wherein the detecting comprises:
      setting a paste listener for a window or a document; and
      using the paste listener, detecting that a field within the window or the document has been modified by adding hidden characters, wherein the detecting is based on comparing values of the window or the document between transfer operations;
   determining, by the computing device, that the one application of the transfer is insecure; and
   in response to the computing device determining that the one application is insecure:
      providing, by the computing device, a plurality of actions so as to mitigate use of sensitive information within the one application, wherein the plurality of actions comprise a first action and a subsequent second action, wherein the first action is based in response to determining that a user has performed a first threshold number of transfer of sensitive information, wherein the subsequent second action is based in response to determining that the user has performed a second threshold number of transfer of sensitive information, wherein the second threshold is higher than the first threshold.

2. The method of claim 1, further comprising:
   transmitting, by the computing device to an analytic server, information for the transfer, identifying: a user associated with the computing device, the one application, the another application for the transfer, a type of the field to receive the sensitive information, and type of the computing device; and
   receiving, by the computing device from the analytic server, an indication of the action based on the transmitted information.

3. The method of claim 1, wherein the transfer of data comprises a copy event and a paste event.

4. The method of claim 3, further comprising:
   setting event listeners for detecting one or more events in the computing device, wherein the event listeners comprise at least one of a copy listener, a paste listener, a clipboard listener, a drag and drop listener, or a navigation listener.

5. The method of claim 1, wherein the detecting the transfer of data further comprises:
   identifying the field to receive the sensitive information within a window or a document; and
   setting a paste listener for the field to receive the sensitive information.

6. The method of claim 1, wherein the determining that the one application of the transfer is insecure further comprises:
   identifying the one application by retrieving identification of an application that last placed data in a clipboard.

7. The method of claim 1, wherein the determining that the one application of the transfer is insecure further comprises:
   identifying the one application by retrieving domain name of a web application using a browser script.

8. An apparatus comprising:
   at least one processor;
   memory storing instructions that, when executed by the at least one processor, cause the apparatus to:
      detect a transfer of data from one application to another, the transfer including a field to receive sensitive information, wherein to detect the transfer:
         set a paste listener for a window or a document; and
         using the paste listener, detect that a field within the window or the document has been modified by adding hidden characters, wherein the detection is based on comparing values of the window or the document between transfer operations;
      determine that the one application of the transfer is insecure;
      in response to the processor determining that the one application is insecure:
         provide a plurality of actions so as to mitigate use of sensitive information within the one application, wherein the plurality of actions comprise a first action and a subsequent second action, wherein the first action is based in response to determining that a user has performed a first threshold number of transfer of sensitive information, wherein the subsequent second action is based in response to determining that the user has performed a second threshold number of transfer of sensitive information, wherein the second threshold is higher than the first threshold.

9. The apparatus of claim 8, wherein the memory further stores instructions that when executed by the at least one processor, cause the apparatus to:
   transmit to an analytic server, information identifying:
   a user associated with apparatus, the one application, the another application, a type of the field to receive the sensitive information, and type of the apparatus;
   receive from the analytic server, an indication of the action based on the transmitted information.

10. The apparatus of claim 8, wherein the transfer of data comprises a copy event and a paste event.

11. The apparatus of claim 10, wherein the memory further stores instructions that when executed by the at least one processor, cause the apparatus to:
   set event listeners for detecting one or more events in the apparatus, wherein the event listeners comprise at least one of a copy listener, a paste listener, a clipboard listener, a drag and drop listener, or a navigation listener.

12. The apparatus of claim 8, wherein to detect the transfer of data, the memory further stores instructions that when executed by the at least one processor, cause the apparatus to:
   identify the field to receive the sensitive information within a window or a document; and
   set a paste listener for the field to receive the sensitive information.

13. The apparatus of claim 8, wherein to determine that the one application of the transfer is insecure, the memory further stores instructions that when executed by the at least one processor, cause the apparatus to:
    identify the one application by retrieving identification of an application that last placed data in a clipboard.

14. The apparatus of claim 8, wherein to determine that the one application is insecure, the memory further stores instructions that when executed by the at least one processor, cause the apparatus to:
    identify the one application by retrieving domain name of a web application using a browser script.

15. A method comprising:
    receiving, by an analytic server from a client computing device, data associated with a transfer of sensitive information at the client computing device, the data comprising identification of: a user associated with the client computing device, a source application for the transfer, a target application for the transfer, information type of the sensitive information, and client computing device type, and paste information type;
    generating, by the analytic server, a risk score associated with the transfer based on the received data;
    generating, by the analytic server, plurality of actions based on the generated risk score and the received data; and
    transmitting, by the analytic server to the client computing device, the one or more actions, wherein the plurality of actions comprise a first action and a subsequent second action, wherein the transmitting comprises:
        transmitting, by the analytic server to the client computing device, the first action in response to determining that the user has performed a first threshold number of transfer of sensitive information; and
        transmitting, by the analytic server to the client computing device, the subsequent second action in response to determining that the user has performed a second threshold number of transfer of sensitive information, wherein the second threshold is higher than the first threshold.

16. The method of claim 15, further comprising:
    generating for display, by the analytic server, a dashboard view of a plurality of risk scores for a plurality of users including the risk score for the user.

17. The method of claim 15, wherein the one or more actions comprise at least one of:
    instructions to generate a warning for a user; instructions to lock the user's account; or
    instructions to generate a prompt for the user to change login credentials.

18. The method of claim 15, wherein the information type of the sensitive information is based on heuristic analysis of the target application.

* * * * *